United States Patent
Yang

(10) Patent No.: US 10,284,102 B2
(45) Date of Patent: May 7, 2019

(54) POWER CONVERSION APPARATUS

(71) Applicant: Excelliance MOS Corporation, Hsinchu County (TW)

(72) Inventor: Poyu Yang, Hsinchu County (TW)

(73) Assignee: Excelliance MOS Corporation, Hsinchu County (TW)

( * ) Notice: Subject to any disclaimer, the term of this patent is extended or adjusted under 35 U.S.C. 154(b) by 45 days.

(21) Appl. No.: 16/018,081

(22) Filed: Jun. 26, 2018

(65) Prior Publication Data

US 2018/0302001 A1    Oct. 18, 2018

Related U.S. Application Data

(62) Division of application No. 14/876,848, filed on Oct. 7, 2015, now Pat. No. 10,033,287.

(30) Foreign Application Priority Data

Aug. 10, 2015    (TW) .............................. 104125976 A

(51) Int. Cl.
*H02M 1/38*    (2007.01)
*H02M 3/335*    (2006.01)

(52) U.S. Cl.
CPC ......... *H02M 3/33592* (2013.01); *H02M 1/38* (2013.01); *Y02B 70/1475* (2013.01)

(58) Field of Classification Search
CPC ......... H02M 3/33576; H02M 3/33592; H02M 3/33515; H02M 3/33538; H02M 3/33546; H02M 3/33507

See application file for complete search history.

(56) References Cited

U.S. PATENT DOCUMENTS

| 2010/0027298 A1* | 2/2010 | Cohen | H02M 3/33592 363/21.14 |
| 2015/0049523 A1* | 2/2015 | Yang | H02M 3/33592 363/21.14 |

FOREIGN PATENT DOCUMENTS

TW    200816613    4/2008

OTHER PUBLICATIONS

"Office Action of China Counterpart Application", dated May 23, 2018, p. 1-p. 5.

* cited by examiner

*Primary Examiner* — Bryan R Perez
(74) *Attorney, Agent, or Firm* — JCIPRNET

(57) ABSTRACT

A power conversion apparatus including a transformer, a synchronous rectification (SR) transistor and an SR control circuit is provided. A first terminal of a primary side of the transformer receives an input voltage, and a first terminal of a secondary side outputs a DC voltage. A drain terminal of the SR transistor is coupled to a second terminal of the secondary side of the transformer. A source terminal of the SR transistor is coupled to a ground terminal. The SR control circuit receives a signal of the drain terminal of the SR transistor to serve it as a detection signal and generate a duty cycle signal. The SR control circuit converts the duty signal into a charging current and a discharging current so as to charge and discharge an energy-storage device and generate a first voltage. The SR control circuit turns off the SR transistor according to the first voltage.

9 Claims, 13 Drawing Sheets

POWER CONVERSION APPARATUS

CROSS-REFERENCE TO RELATED APPLICATION

This application is a divisional application of and claims the priority benefit of U.S. application Ser. No. 14/876,848, filed on Oct. 7, 2015, now allowed, which claims the priority benefit of Taiwan application no. 104125976, filed on Aug. 10, 2015. The entirety of the above-mentioned patent application is hereby incorporated by reference herein and made a part of this specification.

BACKGROUND

Field of the Invention

The disclosure is directed to a power apparatus and more particularly, to a power conversion apparatus.

Description of Related Art

A power conversion apparatus is an indispensable element of a modern electronic apparatus. In a pulse width modulation (PWM) control-based power conversion apparatus, a secondary side of the power conversion apparatus usually has a rectifier diode. The rectifier diode has higher power consumption when being at an on state, and thus, a synchronous rectification (SR) transistor with lower on-resistance (Rds-on) can be used to substitute for the rectifier diode to improve a conversion efficiency of the power conversion apparatus. Under such an architecture, an SR controller is further required for controlling the on/off states of the SR transistor of the secondary side.

Generally, when the SR transistor of the secondary side of the power conversion apparatus is turned on, the SR controller can measure a voltage difference between a drain and a source of the SR transistor, so as to determine when to turn off the SR transistor. However, the aforementioned method is only applicable to a scenario that the power conversion apparatus is operated in a discontinuous current mode (DCM) or a boundary current mode (BCM), but not applicable to a scenario that the power conversion apparatus is operated in the continuous current mode (CCM). In case the method is applied to the power conversion apparatus operated in the CCM, a situation that the power switch of the primary side and the SR transistor of the secondary side in the power conversion apparatus are turned on simultaneously may occur. As a result, noise may occur, and internal circuit elements of the power conversion apparatus may be damaged.

SUMMARY

Accordingly, the disclosure provides a power conversion apparatus. The power conversion apparatus may be operated in a discontinuous current mode (DCM), a boundary current mode (BCM) or a continuous current mode (CCM). When the power conversion apparatus is operated in the CCM, the SR control circuit may turn off a synchronous rectification (SR) transistor of a secondary side of the power conversion apparatus before a power switch of a primary side of the power conversion apparatus is turned on. In this way, noise occurring due to both the power switch and the SR transistor at an on state simultaneously can be avoided, so as to prevent internal circuit elements of the power conversion apparatus from being damaged.

The disclosure is directed to a power conversion apparatus including a transformer, an SR transistor and an SR control circuit. The transformer has a primary side and a secondary side. A first terminal of the primary side is configured to receive an input voltage, and a first terminal of the secondary side is configured to provide an output voltage to a load. A drain terminal of the SR transistor is coupled to a second terminal of the secondary side. A source terminal of the SR transistor is coupled to a first ground terminal. A gate terminal of the SR transistor is configured to receive a control signal. The SR control circuit is coupled to the SR transistor. The SR control circuit receives a signal of the drain terminal of the SR transistor and serves it as a detection signal and generates at least one duty cycle signal according to the detection signal. The SR control circuit converts the at least one duty cycle signal into a charging current and a discharging current, charges and discharges an energy-storage device according to the charging current and the discharging current to generate a first voltage and generates the control signal according to the first voltage to disable the SR transistor.

In an embodiment of the disclosure, the at least one duty cycle signal includes a first duty cycle signal. The SR control circuit includes a first control circuit, a first comparator and a second control circuit. The first control circuit is configured to compare the detection signal with a first reference voltage to generate the first duty cycle signal. The first control circuit converts the first duty cycle signal into the charging current and the discharging current. The first control circuit charges the energy-storage device during an enable period of the first duty cycle signal and discharges the energy-storage device during a disable period of the first duty cycle signal to generate the first voltage. The first comparator is coupled to the first control circuit to receive the first voltage, and compares the first voltage with a first threshold voltage to generate a first comparison signal. The second control circuit is coupled to the first comparator to receive the first comparison signal. When the first comparison signal indicates that the first voltage is lower than the first threshold voltage, the second control circuit generates the control signal to disable the SR transistor.

In an embodiment of the disclosure, the first control circuit includes a second comparator, a conversion circuit and a charging/discharging capacitor. A non-inverting input terminal of the second comparator receives the detection signal. An inverting input terminal of the second comparator receives the first reference voltage. An output terminal of the second comparator outputs the first duty cycle signal. The conversion circuit is coupled to the second comparator to receive the first duty cycle signal. The conversion circuit converts the inverting first duty cycle signal to generate the charging current. The conversion circuit converts the first duty cycle signal to generate the discharging current. A first terminal of the charging/discharging capacitor is coupled to the conversion circuit. A second terminal of the charging/discharging capacitor is coupled to the first ground terminal. The conversion circuit charges the charging/discharging capacitor according to the charging current during the enable period of the first duty cycle signal and discharges the charging/discharging capacitor according to the discharging current during the disable period of the first duty cycle signal to generate the first voltage.

In an embodiment of the disclosure, the conversion circuit includes an inverter, a charging circuit and a discharging circuit. An input terminal of the inverter is coupled to the output terminal of the second comparator. An enable terminal of the charging circuit is coupled to the output terminal of the second comparator to receive the first duty cycle signal. An input terminal of the charging circuit is coupled to the output terminal of the inverter to receive the inverting first duty cycle signal. The charging circuit converts the inverting first duty cycle signal into the charging current and charges the charging/discharging capacitor according to the charging current during the enable period of the first duty cycle signal. An input terminal of the discharging circuit is coupled to the output terminal of the second comparator to receive the first duty cycle signal. An enable terminal of the discharging circuit is coupled to the output terminal of the inverter to receive the inverting first duty cycle signal. The discharging circuit converts the first duty cycle signal into the discharging current and discharges the charging/discharging capacitor according to the discharging current during the disable period of the first duty cycle signal.

In an embodiment of the disclosure, the charging circuit includes a first resistor, a first capacitor, a second resistor, a second capacitor, a voltage-to-current convertor and a charging switch. A first terminal of the first resistor is coupled to the input terminal of the charging circuit to receive the inverting first duty cycle signal. A first terminal of the first capacitor is coupled to a second terminal of the first resistor. A second terminal of the first capacitor is coupled to the first ground terminal. A first terminal of the second resistor is coupled to a second terminal of the first resistor. A first terminal of the second capacitor is coupled to a second terminal of the second resistor generate a charging voltage. A second terminal of the second capacitor is coupled to the first ground terminal. The voltage-to-current convertor is coupled to the first terminal of the second capacitor to receive the charging voltage, so as to generate a charging current. A control terminal of the charging switch is coupled to the enable terminal of the charging circuit to receive the first duty cycle signal. The charging switch is coupled between the voltage-to-current convertor and the first terminal of the charging/discharging capacitor. The charging switch transmits the charging current to charge the charging/discharging capacitor during the enable period of the first duty cycle signal.

In an embodiment of the disclosure, the charging circuit includes a first transistor, a first resistor, a first capacitor, a voltage-to-current convertor and a charging switch. A drain terminal of the first transistor is coupled to a power supply terminal. A gate terminal of the first transistor is coupled to the input terminal of the charging circuit to receive the inverting first duty cycle signal. A first terminal of the first resistor is coupled to a source terminal of the first transistor. A second terminal of the first resistor is coupled to the first ground terminal. A first terminal of the first capacitor is coupled to the source terminal of the first transistor to generate a charging voltage. A second terminal of the first capacitor is coupled to the first ground terminal. The voltage-to-current convertor is coupled to the first terminal of the first capacitor to receive the charging voltage, so as to generate the charging current. A control terminal of the charging switch is coupled to the enable terminal of the charging circuit to receive the first duty cycle signal. The charging switch is coupled between the voltage-to-current convertor and the first terminal of the charging/discharging capacitor. The charging switch transmits the charging current to charge the charging/discharging capacitor during the enable period of the first duty cycle signal.

In an embodiment of the disclosure, the charging circuit includes a controllable current source, a first capacitor, a voltage-to-current convertor and a charging switch. A control terminal of the controllable current source is coupled to the input terminal of the charging circuit to receive the inverting first duty cycle signal. A first terminal of the controllable current source is coupled to a power supply terminal. A first terminal of the first capacitor is coupled to a second terminal of the controllable current source to generate a charging voltage. A second terminal of the first capacitor is coupled to the first ground terminal. The voltage-to-current convertor is coupled to the first terminal of the first capacitor to receive the charging voltage, so as to generate the charging current. A control terminal of the charging switch is coupled to the enable terminal of the charging circuit to receive the first duty cycle signal. The charging switch is coupled between the voltage-to-current convertor and the first terminal of the charging/discharging capacitor. The charging switch transmits the charging current to charge the charging/discharging capacitor during the enable period of the first duty cycle signal.

In an embodiment of the disclosure, the discharging circuit includes a first resistor, a first capacitor, a second resistor, a second capacitor, a voltage-to-current convertor and a discharging switch. A first terminal of the first resistor is coupled to the input terminal of the discharging circuit to receive the first duty cycle signal. A first terminal of the first capacitor coupled to a second terminal of the first resistor. A second terminal of the first capacitor is coupled to the first ground terminal. A first terminal of the second resistor is coupled to the second terminal of the first resistor. A first terminal of the second capacitor is coupled to a second terminal of the second resistor to generate a discharging voltage. A second terminal of the second capacitor is coupled to the first ground terminal. The voltage-to-current convertor is coupled to the first terminal of the second capacitor to receive the discharging voltage, so as to generate the discharging current. A control terminal of the discharging switch is coupled to the enable terminal of the discharging circuit to receive the inverting first duty cycle signal. The discharging switch is coupled between the voltage-to-current convertor and the first terminal of the charging/discharging capacitor. The discharging switch transmits the discharging current to discharge the charging/discharging capacitor during the disable period of the first duty cycle signal.

In an embodiment of the disclosure, the discharging circuit includes a first transistor, a first resistor, a first capacitor, a voltage-to-current convertor and a discharging switch. A drain terminal of the first transistor is coupled to a power supply terminal. A gate terminal of the first transistor is coupled to the input terminal of the discharging circuit to receive the first duty cycle signal. A first terminal of the first resistor is coupled to the source terminal of the first transistor. A second terminal of the first resistor is coupled to the first ground terminal. A first terminal of the first capacitor is coupled to the source terminal of the first transistor to generate a discharging voltage. A second terminal of the first capacitor is coupled to the first ground terminal. The voltage-to-current convertor is coupled to the first terminal of the first capacitor to receive the discharging voltage, so as to generate the discharging current. A control terminal of the discharging switch is coupled to the enable terminal of the discharging circuit to receive the inverting first duty cycle signal. The discharging switch is coupled between the voltage-to-current convertor and the first terminal of the charging/discharging capacitor. The discharging switch transmits the discharging current to discharge the charging/discharging capacitor during the disable period of the first duty cycle signal.

In an embodiment of the disclosure, the discharging circuit includes a controllable current source, a first capacitor, a voltage-to-current convertor and a discharging switch. A control terminal of the controllable current source is coupled to the input terminal of the discharging circuit to receive the first duty cycle signal. A first terminal of the controllable current source is coupled to a power supply terminal. A first terminal of the first capacitor is coupled to the second terminal of the controllable current source to generate a discharging voltage. A second terminal of the first capacitor is coupled to the first ground terminal. The voltage-to-current convertor is coupled to the first terminal of the first capacitor to receive the discharging voltage, so as to generate the discharging current. A control terminal of the discharging switch is coupled to the enable terminal of the discharging circuit to receive the inverting first duty cycle signal. The discharging switch is coupled between the voltage-to-current convertor and the first terminal of the charging/discharging capacitor. The discharging switch transmits the discharging current to discharge the charging/discharging capacitor during the disable period of the first duty cycle signal.

In an embodiment of the disclosure, the power conversion apparatus further includes a third control circuit. The third control circuit is configured to compare the detection signal with a second threshold voltage to generate a second comparison signal and coupled to the first control circuit. The second control circuit is further coupled to the third control circuit to receive the second comparison signal. When the power conversion apparatus is operated in a discontinuous current mode (DCM) or a boundary current mode (BCM), and the second comparison signal indicates that the detection signal is greater than the second threshold voltage, second control circuit the second control circuit generates the control signal to disable the SR transistor, and the third control circuit resets the first voltage. When the power conversion apparatus is operated in a continuous current mode (CCM), and the first comparison signal indicates that the first voltage is lower than the first threshold voltage, the second control circuit generates the control signal to disable the SR transistor.

In an embodiment of the disclosure, the third control circuit includes a third comparator, a one-shot circuit and a reset switch. A non-inverting input terminal of the third comparator receives the detection signal. An inverting input terminal of the third comparator receives the second threshold voltage. An output terminal of the third comparator outputs the second comparison signal. The one-shot circuit is coupled to the third comparator to receive the second comparison signal, so as to generate a pulse signal. A first terminal of the reset switch is coupled to an output terminal of the first control circuit. A second terminal of the reset switch is coupled to the first ground terminal. A control terminal of the reset switch is coupled to the one-shot circuit to receive the pulse signal. The reset switch is turned on in response to enablement of the pulse signal to reset the first voltage.

In an embodiment of the disclosure, the enable period of the first duty cycle signal is an off period of the SR transistor, and the disable period of the first duty cycle signal includes an on period of the SR transistor.

In an embodiment of the disclosure, the power conversion apparatus further includes a power switch. A first terminal of the power switch is coupled to the second terminal of the primary side. A second terminal of the power switch is coupled to a second ground terminal. A control terminal of the power switch is controlled by a pulse width modulation (PWM) signal. The enable period of the first duty cycle signal is an on period of the power switch, and the disable period of the first duty cycle signal is an off period of the power switch.

In an embodiment of the disclosure, a current value of the charging current is proportional to a time length of the disable period of the first duty cycle signal. A current value of the discharging current is proportional to a time length of the enable period of the first duty cycle signal.

In an embodiment of the disclosure, the at least one duty cycle signal includes a first duty cycle signal and a second duty cycle signal. The SR control circuit includes a first control circuit, a first comparator and a second control circuit. The first control circuit is configured to compare the detection signal with a first reference voltage to generate the first duty cycle signal. The first control circuit is configured to compare the detection signal with a second reference voltage to generate the second duty cycle signal. The first control circuit converts the first duty cycle signal into the discharging current. The first control circuit converts convert the second duty cycle signal into the charging current. The first control circuit charges the energy-storage device during the enable period of the first duty cycle signal and discharges the energy-storage device an enable period of the second duty cycle signal to generate the first voltage. The first comparator is coupled to the first control circuit to receive the first voltage, and compares the first voltage with a first threshold voltage to generate a first comparison signal. The second control circuit is coupled to the first comparator to receive the first comparison signal. When the first comparison signal indicates that the first voltage is lower than the first threshold voltage, the second control circuit generates the control signal to disable the SR transistor.

In an embodiment of the disclosure, the first control circuit includes a second comparator, a third comparator, a conversion circuit and a charging/discharging capacitor. A non-inverting input terminal of the second comparator receives the detection signal. An inverting input terminal of the second comparator receives the first reference voltage. An output terminal of the second comparator outputs the first duty cycle signal. An inverting input terminal of the third comparator receives the detection signal. A non-inverting input terminal of the third comparator receives the second reference voltage. An output terminal of the third comparator outputs the second duty cycle signal. The conversion circuit is coupled to the second comparator to receive the first duty cycle signal and coupled to the third comparator to receive the second duty cycle signal. The conversion circuit converts the second duty cycle signal to generate the charging current. The conversion circuit converts the first duty cycle signal to generate the discharging current. A first terminal of the charging/discharging capacitor is coupled to the conversion circuit. A second terminal of the charging/discharging capacitor is coupled to the first ground terminal. The conversion circuit charges the charging/discharging capacitor according to the charging current during the enable period of the first duty cycle signal and discharges the charging/discharging capacitor according to the discharging current during the enable period of the second duty cycle signal to generate the first voltage.

In an embodiment of the disclosure, the conversion circuit includes a charging circuit and a discharging circuit. An enable terminal of the charging circuit is coupled to the output terminal of the second comparator to receive the first duty cycle signal. An input terminal of the charging circuit is coupled to the output terminal of the third comparator to receive the second duty cycle signal. The charging circuit converts the second duty cycle signal into the charging current and charges the charging/discharging capacitor according to the charging current during the enable period of the first duty cycle signal. An input terminal of the discharging circuit is coupled to the output terminal of the second comparator to receive the first duty cycle signal. An enable terminal of the discharging circuit is coupled to the output terminal of the third comparator to receive the second duty cycle signal. The discharging circuit converts the first duty cycle signal into the discharging current and discharges the charging/discharging capacitor according to the discharging current during the enable period of the second duty cycle signal.

In an embodiment of the disclosure, the power conversion apparatus further includes a power switch. A first terminal of the power switch is coupled to the second terminal of the primary side. A second terminal of the power switch is coupled to a second ground terminal. A control terminal of the power switch is controlled by a PWM signal. The enable period of the first duty cycle signal is an on period of the power switch, and an enable period of the second duty cycle signal includes an on period of the SR transistor, wherein the first reference voltage is greater than the second reference voltage.

In an embodiment of the disclosure, a current value of the charging current is proportional to a time length of the enable period of the second duty cycle signal. A current value of the discharging current is proportional to a time length of the enable period of the first duty cycle signal.

To sum up, the power conversion apparatus of the disclosure can be operated in the DCM, the BCM or the CCM. When the power conversion apparatus is operated in the CCM, the SR control circuit can turn off the SR transistor of the secondary side of the power conversion apparatus before the power switch of the primary side of the power conversion apparatus is turned on. In this way, noise occurring due to the on period of the power switch overlapping the on period of the SR transistor can be avoided, and internal circuit elements of the power conversion apparatus can be prevented from being damaged.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

In order to make the disclosure more comprehensible, embodiments are described below as examples showing that the disclosure can actually be realized. The embodiments provided herein are only for an illustrative purpose, instead of limiting the scope of the disclosure.

Figure 1:
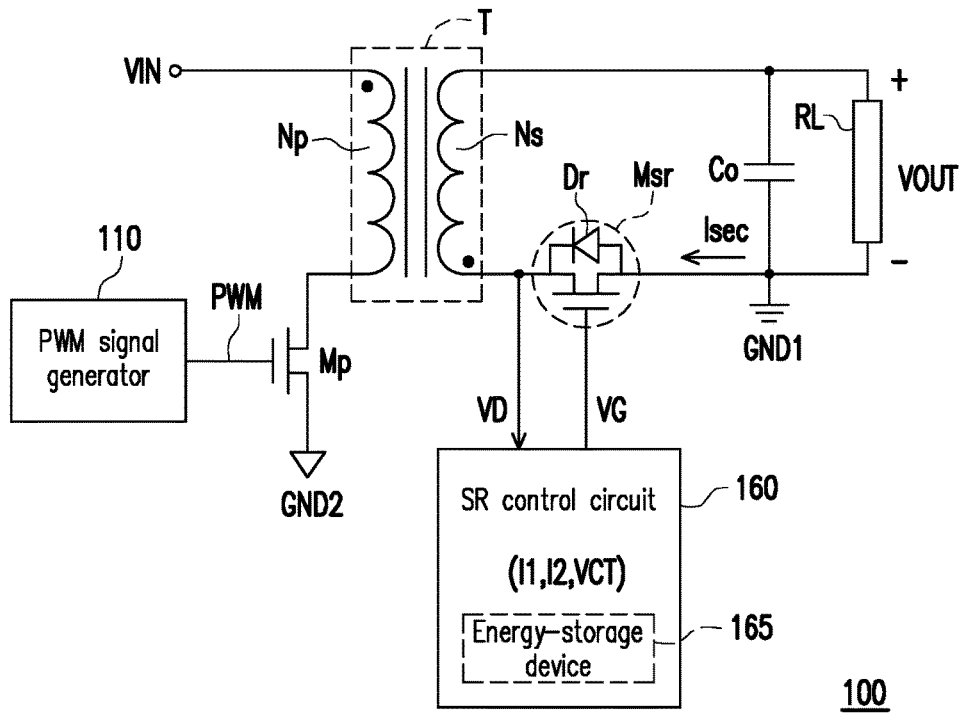
FIG. 1 is a schematic circuit diagram illustrating a power conversion apparatus according to an embodiment of the disclosure.

FIG. 1 is a schematic circuit diagram illustrating a power conversion apparatus 100 according to an embodiment of the disclosure. Referring to FIG. 1, the power conversion apparatus 100 includes a transformer T, a synchronous rectification (SR) transistor Msr, an SR control circuit 160, a power switch Mp and a pulse width modulation (PWM) signal generator 110. The transformer T includes a primary side Np and a secondary side Ns. A first terminal (e.g., a common-polarity terminal, which is dotted) of the primary side Np is configured to receive the input voltage VIN, and a first terminal (e.g., an opposite-polarity terminal, which is not dotted) of the secondary side Ns is configured to provide an output voltage VOUT to a load RL (e.g., an electronic apparatus), but the disclosure is not limited thereto.

A drain terminal of the SR transistor Msr is coupled to a second terminal (e.g., a common-polarity terminal) of the secondary side Ns. A source terminal of the SR transistor Msr is coupled to a first ground terminal GND1. A gate terminal of the SR transistor Msr is configured to receive a control signal VG The SR control circuit 160 is coupled to the drain terminal of the SR transistor Msr. The SR control circuit 160 receives a signal (e.g., a voltage signal) of the drain terminal of the SR transistor Msr and serves it as a detection signal VD, and generates at least one duty cycle signal (e.g., a first duty cycle signal or a second duty cycle signal) according to the detection signal VD. The SR control circuit 160 may convert at least one duty cycle signal into a charging current I1 and a discharging current I2. The SR control circuit 160 may charge and discharge the energy-storage device 165 respectively according to the charging current I1 and the discharging current I2 to generate a first voltage VCT. The SR control circuit 160 may generate a control signal VG according to the first voltage VCT to disable the SR transistor Msr. It should be noted that a parasitic diode Dr exists between the drain terminal of the SR transistor Msr and a body terminal of the SR transistor Msr.

On the other hand, a first terminal of the power switch Mp is coupled to a second terminal (e.g., an opposite-polarity terminal) of the primary side Np. A second terminal of the power switch Mp is coupled to a second ground terminal GND2. A control terminal of the power switch Mp is configured to receive a PWM signal PWM. The PWM signal generator 110 is coupled to the control terminal of the power switch Mp and is configured to generate and adjust the PWM signal PWM according to a state of the load RL (or a power supply requirement).

Figure 2:
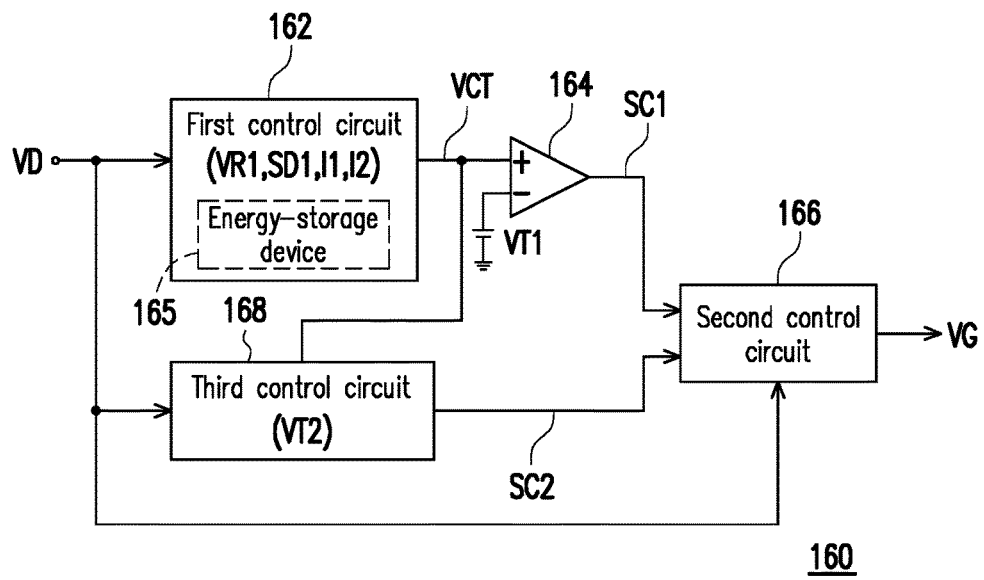
FIG. 2 is a schematic circuit block diagram illustrating the SR control circuit according to an embodiment of the disclosure.

With reference to both FIG. 1 and FIG. 2 hereinafter, FIG. 2 is schematic circuit block diagram illustrating the SR control circuit 160 according to an embodiment of the disclosure. Referring to FIG. 2, the SR control circuit 160 may include a first control circuit 162, a first comparator 164, a second control circuit 166 and a third control circuit 168. In the embodiment illustrated in FIG. 2, when the power conversion apparatus 100 is operated in a continuous current mode (CCM), when to disable the SR transistor Msr may be determined by the first control circuit 162 and the first comparator 164 to avoid an on period of the power switch Mp from overlapping an on period of the SR transistor Msr. In contrast, when the power conversion apparatus 100 is operated in a discontinuous current mode (DCM) or a boundary current mode (BCM), when to disable the SR transistor Msr may be determined by the third control circuit 168.

Furthermore, the first control circuit 162 may be configured to compare the detection signal VD with a first reference voltage VR1 to generate a first duty cycle signal SD1. The first control circuit 162 may convert the first duty cycle signal SD1 into the charging current I1 and the discharging current I2. The first control circuit 162 may charge the energy-storage device 165 during an enable period of the first duty cycle signal SD1 and discharge the energy-storage device 165 during a disable period of the first duty cycle signal SD1 to generate the first voltage VCT.

The first comparator 164 is coupled to the first control circuit 162 to receive the first voltage VCT. The first comparator 164 may compare the first voltage VCT with a first threshold voltage VT1 to generate a first comparison signal SC1. The second control circuit 166 is coupled to the first comparator 164 to receive the first comparison signal SC.

When the power conversion apparatus 100 is operated in the CCM, and the first comparison signal SC1 indicates that the first voltage VCT is lower than the first threshold voltage VT1, the second control circuit 166 may generate the control signal VG to disable the SR transistor Msr.

The third control circuit 168 may be configured to compare the detection signal VD with a second threshold voltage VT2 to generate a second comparison signal SC2. The second control circuit 166 is coupled to the third control circuit 168 to receive the second comparison signal SC2. Besides, the third control circuit 168 is further coupled to the first control circuit 162 to reset the first voltage VCT.

When the power conversion apparatus 100 is operated in the DCM or the BCM, and the second comparison signal SC2 indicates that the detection signal VD is greater than the second threshold voltage VT2, the second control circuit 166 may generate the control signal VG to disable the SR transistor Msr, and the third control circuit 168 may reset the first voltage VCT.

Figure 3:
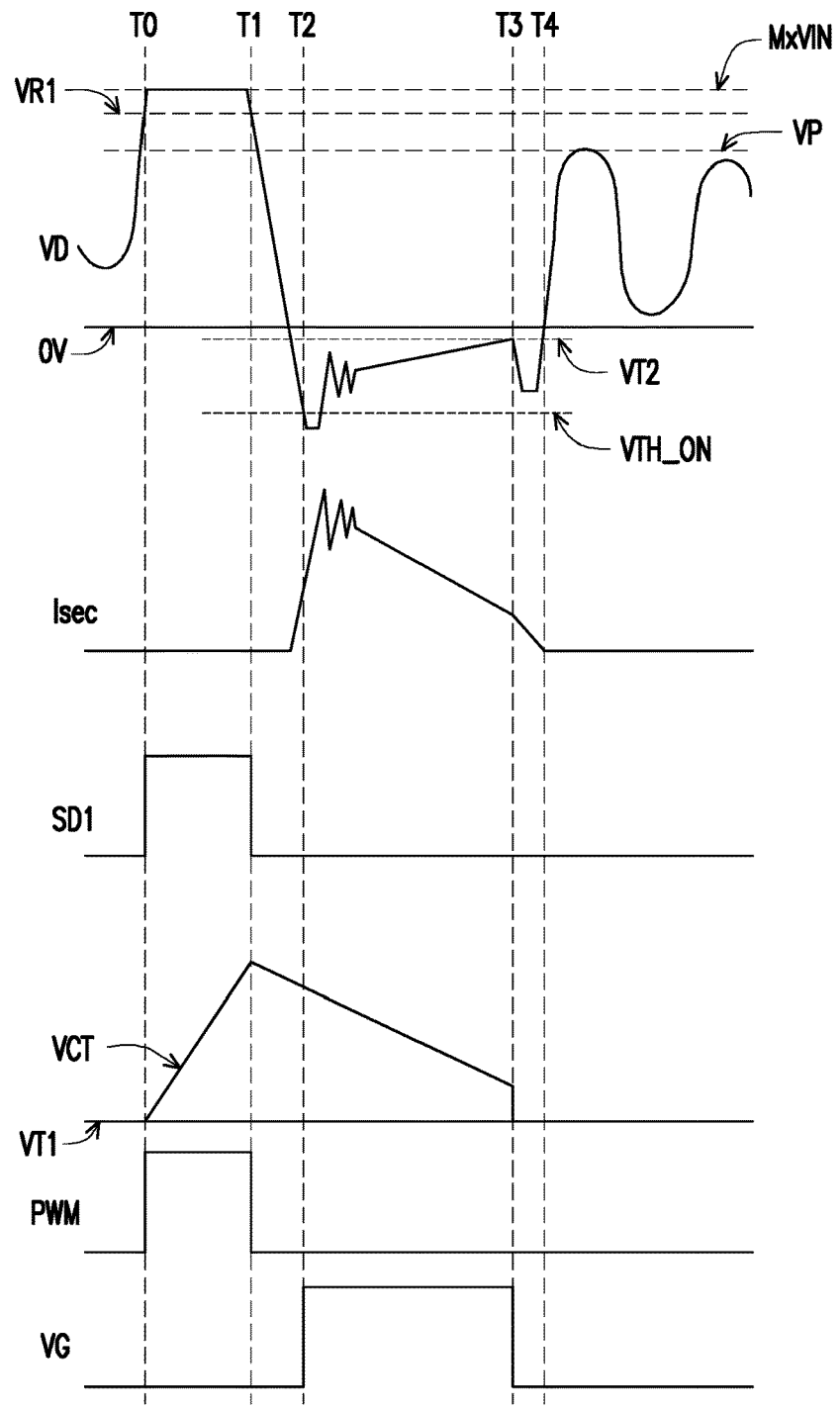
FIG. 3 is a schematic signal timing diagram of the power conversion apparatus depicted in FIG. 1 and the SR control circuit depicted in FIG. 2 being operated in a discontinuous current mode (DCM) or a boundary current mode (BCM).

With reference to FIG. 1 to FIG. 3 simultaneously hereinafter, FIG. 3 is a schematic signal timing diagram of the power conversion apparatus 100 depicted in FIG. 1 and the SR control circuit 160 depicted in FIG. 2 being operated in a discontinuous current mode (DCM) or a boundary current mode (BCM). Referring to FIG. 3, at a time T0, the power switch Mp may be turned on in response to enablement (e.g., a logic high level) of the PWM signal PWM, and the input voltage VIN may provide power to a coil of the primary side Np of the transformer T for storing energy. At the same time, the SR transistor Msr and the parasitic diode Dr are at an off state. Thus, the detection signal VD may have a voltage level of M×VIN, where M is a turn ratio of the secondary side Ns to the primary side Np of the transformer T.

At a time T1, the power switch Mp may be turned off in response to disablement (e.g., a logic low level) of the PWM signal PWM. Based on Lenz's law, the energy stored by the primary side Np of the transformer T is transferred to the secondary side Ns of the transformer T. At this time, since the body terminal of the SR transistor Msr is coupled to the first ground terminal GND1, a voltage level (i.e., the voltage level of the detection signal VD) of the drain terminal of the SR transistor Msr is dropped down from M×VIN to a negative voltage level, and the parasitic diode Dr in the SR transistor Msr is forward biased to be turned on, such that a current Isec is generated at the secondary side Ns to charge a capacitor Co.

When the second control circuit 166 of the SR control circuit 160 detects that the voltage level of the detection signal VD is lower than a reference voltage level VTH_ON (e.g., −200 mV, but not limited in the disclosure), the SR control circuit 160 may generate the control signal VG to turn on the SR transistor Msr, as shown at a time T2. At this time, the current Isec of the secondary side Ns of the transformer T flows from the source terminal of the SR transistor Msr through an internal sensing channel of the SR transistor Msr to the drain terminal of the SR transistor Msr. Thus, the energy transferred to the secondary side Ns of the transformer T may continuously charge the capacitor Co to supply the DC output voltage VOUT to the load RL.

With the capacitor Co being charged continuously by the energy stored by the secondary side Ns, the current Isec of the secondary side Ns is continuously lowered down, such that the voltage level of the detection signal VD is pulled up. As shown at a time T3, when the voltage level of the detection signal VD is greater than the second threshold voltage VT2, the second control circuit 166 may generate the control signal VG to disable the SR transistor Msr. At this time, the current Isec of the secondary side Ns may still flow through the parasitic diode Dr in the SR transistor Msr to charge the capacitor Co, until the current Isec of the secondary side Ns is lowered down to zero (as shown at a time T4). At the time T4, both the power switch Mp and the SR transistor Msr are at the off state. Since the transference of the energy stored by the transformer T is completed, the coil of the primary side Np, a parasitic capacitor of the power switch Mp and an inductor of the coil of the primary side Np start to produce resonance. After the power switch Mp is turned on again, the input voltage VIN may provide power again to the coil of the primary side Np of the transformer T for storing the energy and then repeatedly perform the operations between the time T0 and the time T4.

On the other hand, during the above-mentioned operation of the power conversion apparatus 100, the first control circuit 162 may compare the detection signal VD with the first reference voltage VR1 to generate the first duty cycle signal SD1 (as shown in FIG. 3). The first control circuit 162 may convert the first duty cycle signal SD1 into the charging current I1 and the discharging current I2. The first control circuit 162 may charge the energy-storage device 165 according to the charging current I1 during an enable period (e.g., a time interval from the time T0 to time T1) of the first duty cycle signal SD1 and may discharge the energy-storage device 165 according to the discharging current I2 during a disable period (e.g., a time interval from the time T1 to the time T3) of the first duty cycle signal SD1 to generate the first voltage VCT (as shown in FIG. 3).

The first comparator 164 may compare the first voltage VCT with the first threshold voltage VT1 (which may be approximate to 0V, but the disclosure is not limited thereto) to generate the first comparison signal SC1. In the DCM or the BCM illustrated in FIG. 3, the voltage level of the detection signal VD received by the third control circuit 168 is greater than the second threshold voltage VT2 at the time T3; however, the first voltage VCT generated by the first control circuit 162 is not yet discharged to be lower than the first threshold voltage VT1 at this time. Thus, when the power conversion apparatus 100 is operated in the DCM or the BCM, the second control circuit 166 may disable the SR transistor Msr according to the second comparison signal SC2 generated by the third control circuit 168. In addition, the third control circuit 168 is further coupled to the first control circuit 162 to reset the first voltage VCT at the time T3 (i.e., at the time when the detection signal VD is greater than the second threshold voltage VT2).

Figure 4:
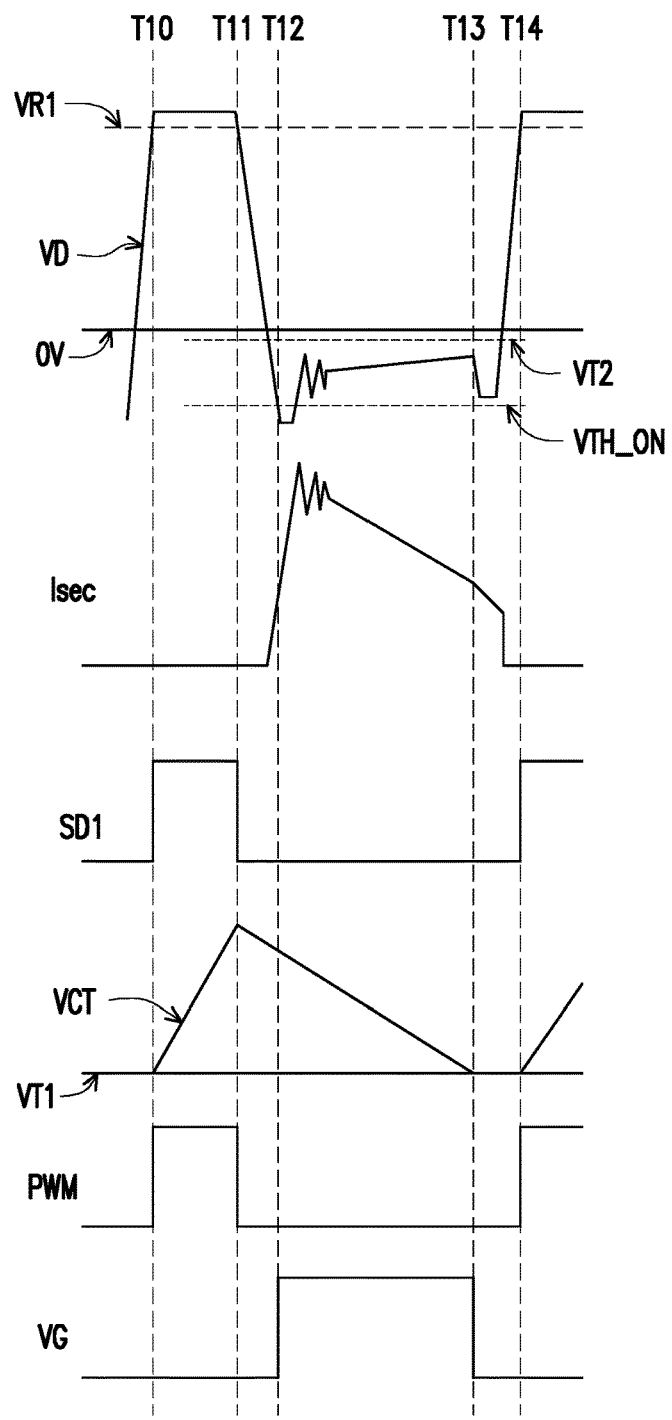
FIG. 4 is a schematic signal timing diagram of the power conversion apparatus depicted in FIG. 1 and the SR control circuit depicted in FIG. 2 being operated in the continuous current mode (CCM).

With reference to FIG. 1, FIG. 2 and FIG. 4 simultaneously, FIG. 4 is a schematic signal timing diagram of the power conversion apparatus 100 depicted in FIG. 1 and the SR control circuit 160 depicted in FIG. 2 being operated in the CCM. The operations of the power conversion apparatus 100 at times T10, T11 and T12 in FIG. 4 are respectively similar to the operations at the times T0, T1 and T2 in FIG. 3, which may refer to the description with respect to FIG. 3 and will not be repeatedly described.

Being different from the operation of the power conversion apparatus 100 at the time T3 in FIG. 3, at a time T13 in FIG. 4, the first voltage VCT generated by the first control circuit 162 may be discharged to be lower than the first threshold voltage VT1 (by means of adjusting a current value of the charging current I1 and a current value of the discharging current I2); however, the voltage level of the detection signal VD received by the third control circuit 168 at this time is not yet greater than the second threshold voltage VT2. In other words, in the CCM, since the electricity of the secondary side Ns is incapable of being completely transmitted to the capacitor Co before the power switch Mp is turned on again (e.g., at a time T14), the current Isec of the secondary side Ns may not be decreased to zero. In this way, a voltage level of the drain terminal of the SR transistor Msr (i.e., the voltage level of the detection signal VD) may not be increased to be greater than the second threshold voltage VT2 before the power switch Mp is turned on again (e.g., at the time T14). Thus, when the power conversion apparatus 100 is operated in the CCM, in order to avoid the on period of the power switch Mp from overlapping the on period of the SR transistor Msr, the second control circuit 166 may disable the SR transistor Msr according to the first comparison signal SC1 generated by the first comparator 164 before the power switch Mp is turned on again.

It is to be mentioned that in an embodiment of the disclosure, a designer may achieve the first duty cycle signal SD1 generated by the first control circuit 162 substantially to be the PWM signal PWM generated by the PWM signal generator 110 through adjusting or setting a voltage level of the first reference voltage VR1, as shown in FIG. 3 or FIG. 4. In this way, the enable period of the first duty cycle signal SD1 is substantially the on period of the power switch Mp, and the disable period of the first duty cycle signal SD1 is substantially an off period of the power switch Mp, but the disclosure is not limited thereto. In the embodiments illustrated in FIG. 3 and FIG. 4, the voltage level of the first reference voltage VR1 may be set to be within a range between M×VIN and a maximum peak value VP of a resonance waveform, but the disclosure is not limited thereto.

Additionally, a current value of the charging current I1 may be proportional to a time length of the disable period of the first duty cycle signal SD1, while a current value of the discharging current I2 may be proportional to a time length of the enable period of the first duty cycle signal SD1, but the disclosure is not limited thereto. Thus, the charging current I1 and the discharging current I2 may be calculated by formulas (1) and (2), where K may be a constant, and DUTY_Q1 may be a duty cycle of the first duty cycle signal SD1 (or the PWM signal PWM, substantially).

$$I1 = K \times (1 - DUTY\_Q1) \quad \text{Formula (1)}$$

$$I2 = K \times DUTY\_Q1 \quad \text{Formula (2)}$$

Figure 5:
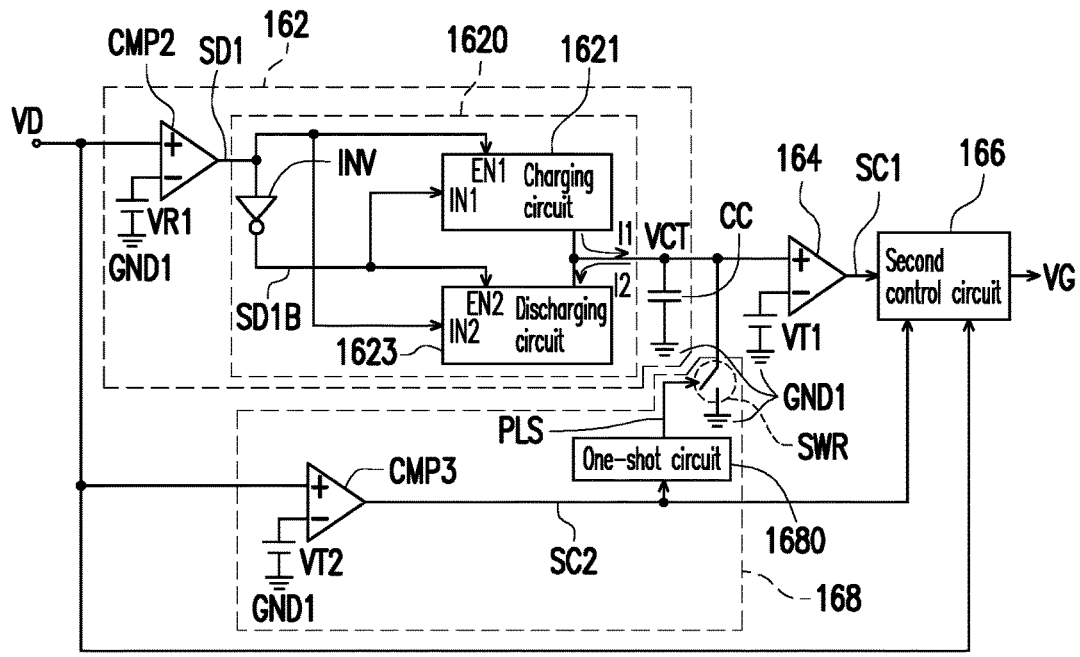
FIG. 5 is a schematic circuit structure diagram of the SR control circuit depicted in FIG. 2.

With reference to both FIG. 2 and FIG. 5 hereinafter, FIG. 5 is a schematic circuit structure diagram of the SR control circuit 160 depicted in FIG. 2. Referring to FIG. 5, the first control circuit 162 may include a second comparator CMP2, a conversion circuit 1620 and a charging/discharging capacitor CC. The charging/discharging capacitor CC is substantially the energy-storage device 165 illustrated in FIG. 2. A non-inverting input terminal of the second comparator CMP2 may receive the detection signal VD, an inverting input terminal of the second comparator CMP2 may receive the first reference voltage VR1, and an output terminal of the second comparator CMP2 may output the first duty cycle signal SD1.

The conversion circuit 1620 is coupled to the second comparator CMP2 to receive the first duty cycle signal SD1. The conversion circuit 1620 may convert an inverting first duty cycle signal SD1B to generate the charging current I1. The conversion circuit 1620 may convert the first duty cycle signal SD1 to generate the discharging current I2. A first terminal of the charging/discharging capacitor CC is coupled to the conversion circuit 1620, and a second terminal of the charging/discharging capacitor CC is coupled to the first ground terminal GND1. The conversion circuit 1620 may charge the charging/discharging capacitor CC according to the charging current I1 during the enable period of the first duty cycle signal SD1 and may discharge the charging/discharging capacitor CC according to the discharging current I2 during the disable period of the first duty cycle signal SD1 to generate the first voltage VCT.

Furthermore, the conversion circuit 1620 may include an inverter INV, a charging circuit 1621 and a discharging circuit 1623. An input terminal of the inverter INV is coupled to the output terminal of the second comparator CMP2. An enable terminal EN1 of the charging circuit 1621 is coupled to the output terminal of the second comparator CMP2 to receive the first duty cycle signal SD1. An input terminal IN1 of the charging circuit 1621 is coupled to an output terminal of the inverter INV to receive the inverting first duty cycle signal SD B. The charging circuit 1621 may convert the inverting first duty cycle signal SD1B into the charging current I1 and may charge the charging/discharging capacitor CC according to the charging current I1 during the enable period of the first duty cycle signal SD1.

An input terminal IN2 of the discharging circuit 1623 is coupled to the output terminal of the second comparator CMP2 to receive the first duty cycle signal SD1. An enable terminal EN2 of the discharging circuit 1623 is coupled to the output terminal of the inverter INV to receive the inverting first duty cycle signal SD1B. The discharging circuit 1623 may convert the first duty cycle signal SD1 into the discharging current I2 and discharge the charging/discharging capacitor CC according to the discharging current I2 during the disable period of the first duty cycle signal SD1.

Figure 6A:
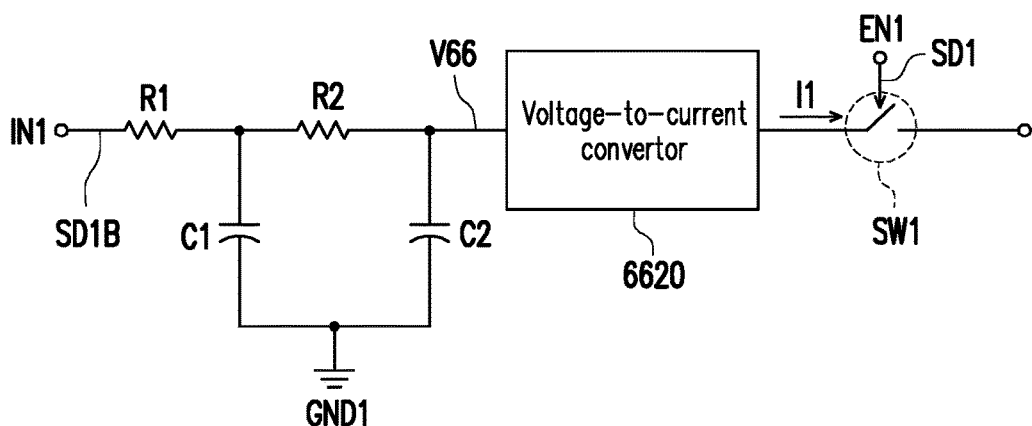
FIG. 6A to FIG. 6C are schematic circuit diagrams of the charging circuit depicted in FIG. 5.

Descriptions with respect to implementations of the charging circuit 1621 and the discharging circuit 1623 will be set forth below. With reference to both FIG. 5 and FIG. 6A hereinafter, FIG. 6A is a schematic circuit diagram of an example of the charging circuit 1621 depicted in FIG. 5. In FIG. 6A, the charging circuit 1621 may include a first resistor R1, a first capacitor C1, a second resistor R2, a second capacitor C2, a voltage-to-current convertor 6620 and a charging switch SW1. A first terminal of the first resistor R1 is coupled to the input terminal IN1 of the charging circuit 1621 to receive the inverting first duty cycle signal SD1B. A first terminal of the first capacitor C1 is coupled to a second terminal of the first resistor R1. A second terminal of the first capacitor C1 is coupled to the first ground terminal GND1. A first terminal of the second resistor R2 is coupled to the second terminal of the first resistor R1. A first terminal of the second capacitor C2 is coupled to a second terminal of the second resistor R2 to generate a charging voltage V66. A second terminal of the second capacitor C2 is coupled to the first ground terminal GND1.

The voltage-to-current convertor 6620 is coupled to the first terminal of the second capacitor C2 to receive the charging voltage V66, so as to generate the charging current I1. A control terminal of the charging switch SW1 is coupled to the enable terminal EN1 of the charging circuit 1621 to receive the first duty cycle signal SD1. The charging switch SW1 is coupled between the voltage-to-current convertor 6620 and the first terminal of the charging/discharging capacitor CC (as shown in FIG. 5). The charging switch SW1 may transmit the charging current I1 during the enable period of the first duty cycle signal SD1 to charge the charging/discharging capacitor CC.

Figure 6B:
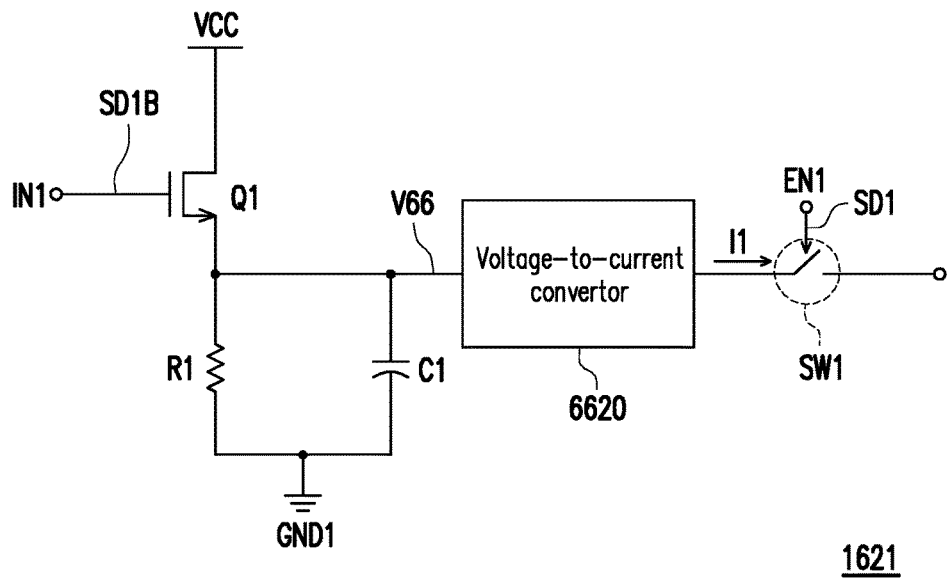

With reference to both FIG. 5 and FIG. 6B hereinafter, FIG. 6B is a schematic circuit diagram of another example of the charging circuit 1621 depicted in FIG. 5. Referring to FIG. 6B, the charging circuit 1621 may include a first transistor Q1, the first resistor R1, the first capacitor C1, the voltage-to-current convertor 6620 and the charging switch SW1. A drain terminal of the first transistor Q1 is coupled to a power supply terminal VCC. A gate terminal of the first transistor Q1 is coupled to the input terminal IN1 of the charging circuit 1621 to receive the inverting first duty cycle signal SD B. The first terminal of the first resistor R1 is coupled to a source terminal of the first transistor Q1. The second terminal of the first resistor R1 is coupled to the first ground terminal GND1. The first terminal of the first capacitor C1 is coupled to the source terminal of the first transistor Q1 to generate the charging voltage V66. The second terminal of the first capacitor C1 is coupled to the first ground terminal GND1.

The voltage-to-current convertor 6620 is coupled to the first terminal of the first capacitor C1 to receive the charging voltage V66, so as to generate the charging current I1. The control terminal of the charging switch SW1 is coupled to the enable terminal EN1 of the charging circuit 1621 to receive the first duty cycle signal SD1. The charging switch SW1 is coupled between the voltage-to-current convertor 6620 and the first terminal of the charging/discharging capacitor CC (as shown in FIG. 5). The charging switch SW1 may transmit the charging current I1 during the enable period of the first duty cycle signal SD1 to charge the charging/discharging capacitor CC.

Figure 6C:
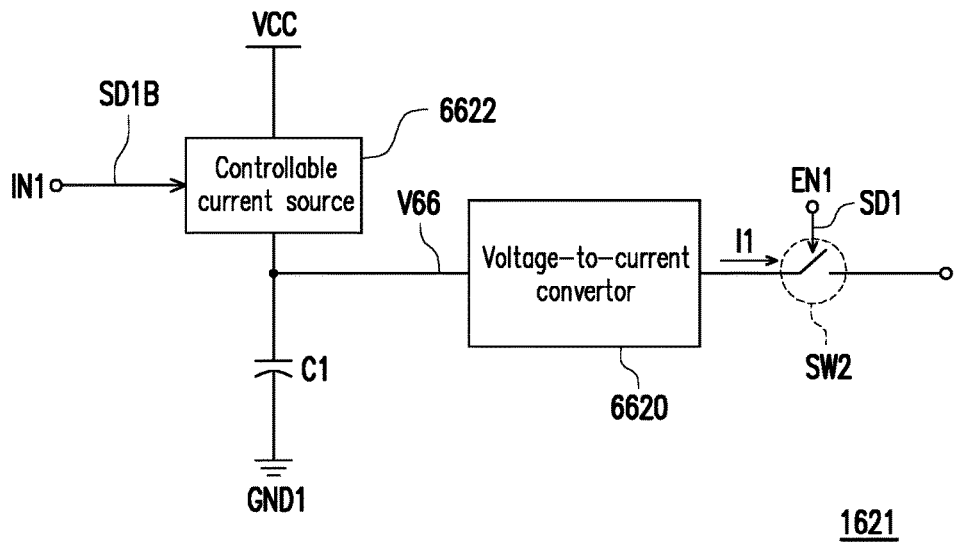

With reference to both FIG. 5 and FIG. 6C, FIG. 6C is a schematic circuit diagram of yet another example of the charging circuit 1621 depicted in FIG. 5. Referring to FIG. 6C, the charging circuit 1621 may include a controllable current source 6622, the first capacitor C1, the voltage-to-current convertor 6620 and a charging switch SW1. A control terminal of the controllable current source 6622 is coupled to an input terminal IN1 of the charging circuit 1621 to receive the inverting first duty cycle signal SD1B. A first terminal of the controllable current source 6622 is coupled to the power supply terminal VCC. The first terminal of the first capacitor C1 is coupled to a second terminal of the controllable current source 6622 to generate the charging voltage V66. The second terminal of the first capacitor C1 is coupled to the first ground terminal GND1.

The voltage-to-current convertor 6620 is coupled to the first terminal of the first capacitor C1 to receive the charging voltage V66, so as to generate the charging current I1. The control terminal of the charging switch SW1 is coupled to the enable terminal EN1 of the charging circuit 1621 to receive the first duty cycle signal SD1. The charging switch SW1 is coupled between the voltage-to-current convertor 6620 and the first terminal of the charging/discharging capacitor CC (as shown in FIG. 5). The charging switch SW1 transmits the charging current I1 during the enable period of the first duty cycle signal SD1 to charge the charging/discharging capacitor CC.

Figure 6D:
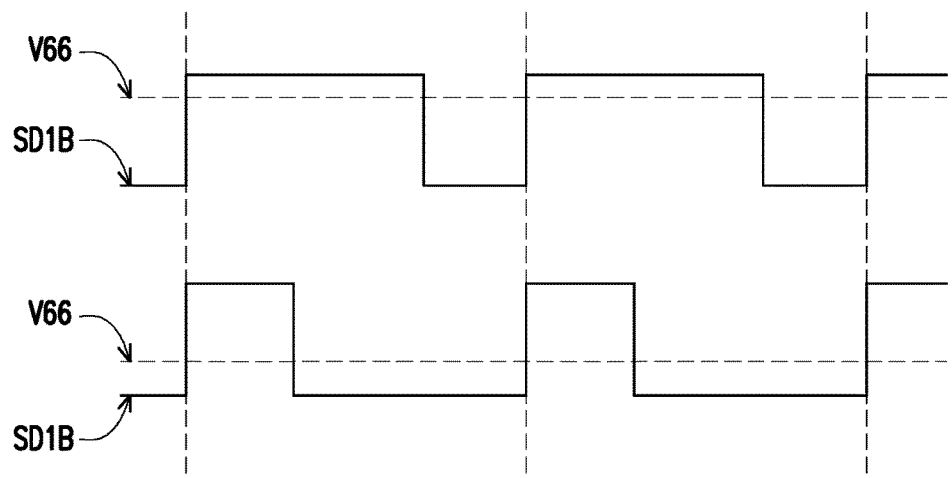
FIG. 6D is a schematic signal waveform graph of the charging circuit depicted in FIG. 6A to FIG. 6C.

With reference to both FIG. 6A to FIG. 6D, FIG. 6D is a schematic signal waveform graph of the charging circuit 1621 depicted in FIG. 6A to FIG. 6C. Referring to FIG. 6D, as the enable period (e.g., the period at the logic high level) of the inverting first duty cycle signal SD1B received by the input terminal IN1 of the charging circuit 1621 is longer, a voltage level of the charging voltage V66 is higher, thus, the charging current I1 converted by and obtained from the voltage-to-current convertor 6620 has a greater value, and vice versa.

Figure 7A:
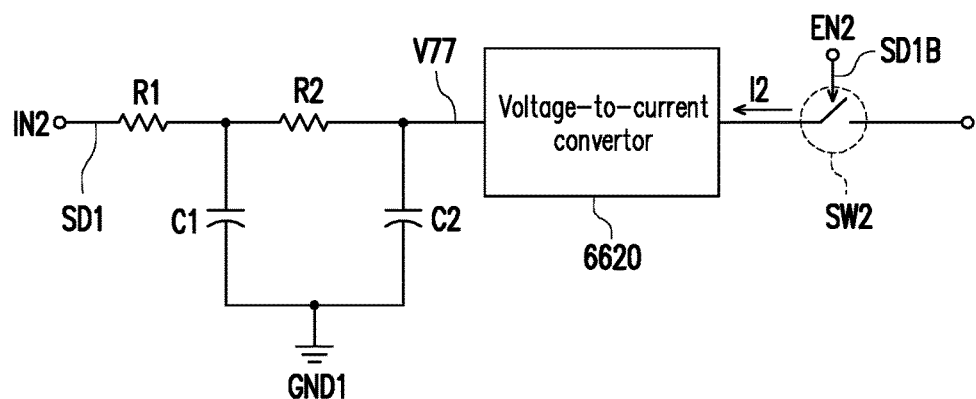
FIG. 7A to FIG. 7C are schematic circuit diagrams of the discharging circuit depicted in FIG. 5.

With reference to both FIG. 5 and FIG. 7A hereinafter, FIG. 7A is a schematic circuit diagram of an example of the discharging circuit 1623 depicted in FIG. 5. Referring to FIG. 7A, the discharging circuit 1623 may include a first resistor R1, a first capacitor C1, a second resistor R2, a second capacitor C2, a voltage-to-current convertor 6620 and a discharging switch SW2. A first terminal of the first resistor R1 is coupled to an input terminal IN2 of the discharging circuit 1623 to receive the first duty cycle signal SD1. A first terminal of the first capacitor C1 is coupled to a second terminal of the first resistor R1. A second terminal of the first capacitor C1 is coupled to the first ground terminal GND1. A first terminal of the second resistor R2 is coupled to the second terminal of the first resistor R1. A first terminal of the second capacitor C2 is coupled to a second terminal of the second resistor R2 to generate a discharging voltage V77. A second terminal of the second capacitor C2 is coupled to the first ground terminal GND1.

The voltage-to-current convertor 6620 is coupled to the first terminal of the second capacitor C2 to receive the discharging voltage V77, so as to generate the discharging current I2. A control terminal of the discharging switch SW2 is coupled to the enable terminal EN2 of the discharging circuit 1623 to receive the inverting first duty cycle signal SD1B. The discharging switch SW2 is coupled between the voltage-to-current convertor 6620 and the first terminal of the charging/discharging capacitor CC (as shown in FIG. 5). The discharging switch SW2 may transmit the discharging current I2 during the disable period of the first duty cycle signal SD1 to discharge the charging/discharging capacitor CC.

Figure 7B:
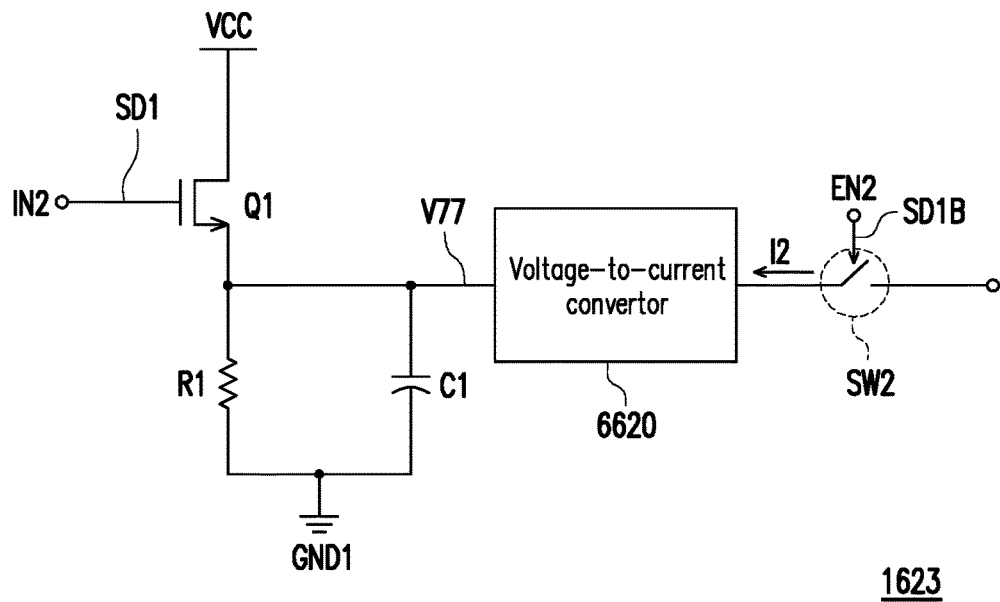

With reference to both FIG. 5 and FIG. 7B hereinafter, FIG. 7B is a schematic circuit diagram of another example of the discharging circuit 1623 depicted in FIG. 5. Referring to FIG. 7B, the discharging circuit 1623 includes a first transistor Q1, the first resistor R1, the first capacitor C1, the voltage-to-current convertor 6620 and the discharging switch SW2. A drain terminal of the first transistor Q1 is coupled to the power supply terminal VCC. A gate terminal of the first transistor Q1 is coupled to the input terminal IN2 of the discharging circuit 1623 to receive the first duty cycle signal SD1. The first terminal of the first resistor R1 is coupled to a source terminal of the first transistor Q1. The second terminal of the first resistor R1 is coupled to the first ground terminal GND1. The first terminal of the first capacitor C1 is coupled to the source terminal of the first transistor Q1 to generate the discharging voltage V77. The second terminal of the first capacitor C1 is coupled to the first ground terminal GND1.

The voltage-to-current convertor 6620 is coupled to the first terminal of the first capacitor C1 to receive the discharging voltage V77, so as to generate the discharging current I2. The control terminal of the discharging switch SW2 is coupled to the enable terminal EN2 of the discharging circuit 1623 to receive the inverting first duty cycle signal SD1B. The discharging switch SW2 is coupled between the voltage-to-current convertor 6620 and the first terminal of the charging/discharging capacitor CC (as shown in FIG. 5). The discharging switch SW2 may transmit the discharging current I2 during the disable period of the first duty cycle signal SD1 to discharge the charging/discharging capacitor CC.

Figure 7C:
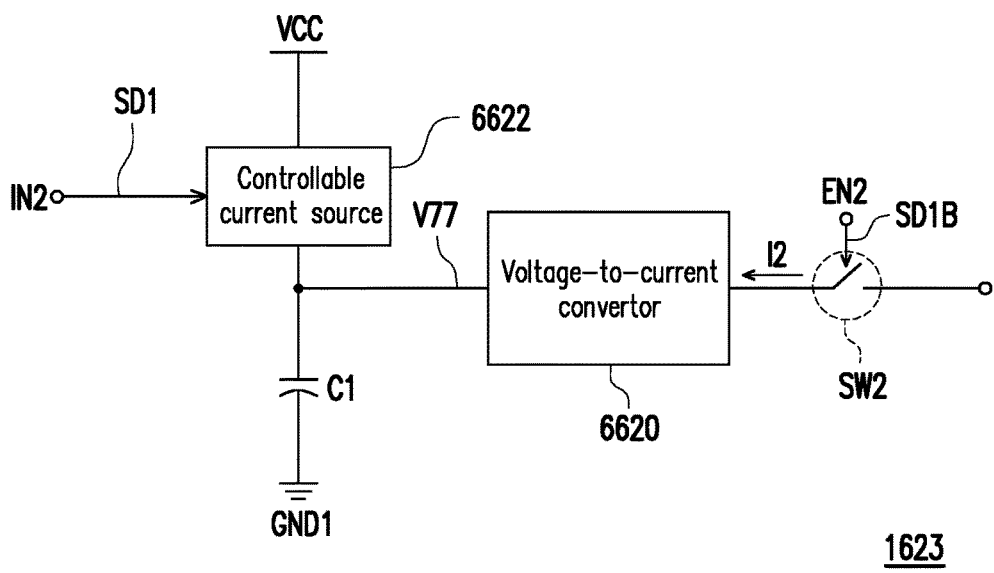

With reference to both FIG. 5 and FIG. 7C hereinafter, FIG. 7C is a schematic circuit diagram of yet another example of the discharging circuit 1623 depicted in FIG. 5. Referring to FIG. 7C, the discharging circuit 1623 may include a controllable current source 6622, the first capacitor C1, the voltage-to-current convertor 6620 and the discharging switch SW2. A control terminal of the controllable current source 6622 is coupled to an input terminal IN2 of the discharging circuit 1623 to receive the first duty cycle signal SD1. A first terminal of the controllable current source 6622 is coupled to the power supply terminal VCC. The first terminal of the first capacitor C1 is coupled to a second terminal of the controllable current source 6622 to generate the discharging voltage V77. The second terminal of the first capacitor C1 is coupled to the first ground terminal GND1.

The voltage-to-current convertor 6620 is coupled to the first terminal of the first capacitor C1 to receive the discharging voltage V77, so as to generate the discharging current I2. The control terminal of the discharging switch SW2 is coupled to the enable terminal EN2 of the discharging circuit 1623 to receive the inverting first duty cycle signal SD1B. The discharging switch SW2 is coupled to between the voltage-to-current convertor 6620 and the first terminal of the charging/discharging capacitor CC (as shown in FIG. 5). The discharging switch SW2 may transmit the discharging current I2 during the disable period of the first duty cycle signal SD1 to discharge the charging/discharging capacitor CC.

In the same way, as the enable period (e.g., the period at the logic high level) of the first duty cycle signal SD1 received by the input terminal IN2 of the discharging circuit 1623 is longer, a voltage level of the discharging voltage V77 is higher, thus, the discharging current I2 converted by and obtained from the voltage-to-current convertor 6620 has a greater value, and vice versa.

Referring to FIG. 5 again, in an embodiment of the disclosure, the third control circuit 168 may include a third comparator CMP3, a one-shot circuit 1680 and a reset switch SWR. A non-inverting input terminal of the third comparator CMP3 may receive the detection signal VD, an inverting input terminal of the third comparator CMP3 may receive the second threshold voltage VT2, and an output terminal of the third comparator CMP3 may output the second comparison signal SC2. The one-shot circuit 1680 is coupled to the third comparator CMP3 to receive the second comparison signal SC2, so as to generate a pulse signal PLS. A first terminal of the reset switch SWR is coupled to an output terminal of the first control circuit 162, a second terminal of the reset switch SWR is coupled to the first ground terminal GND1, and a control terminal of the reset switch SWR is coupled to the one-shot circuit 1682 to receive the pulse signal PLS. The reset switch SWR may be turned on in response to enablement of the pulse signal PLS to reset the first voltage VCT. The detailed operations with respect to the third control circuit 168 have been described with reference to FIG. 2 to FIG. 4 and thus, will not be repeatedly described.

Figure 8:
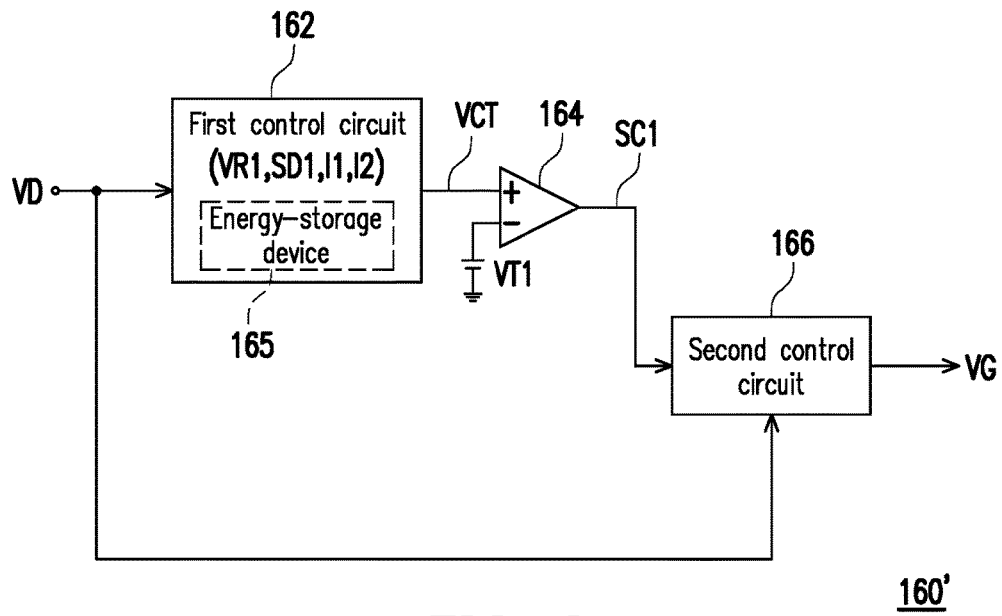
FIG. 8 is a schematic circuit block diagram illustrating an SR control circuit according to another embodiment of the disclosure.
Figure 9:
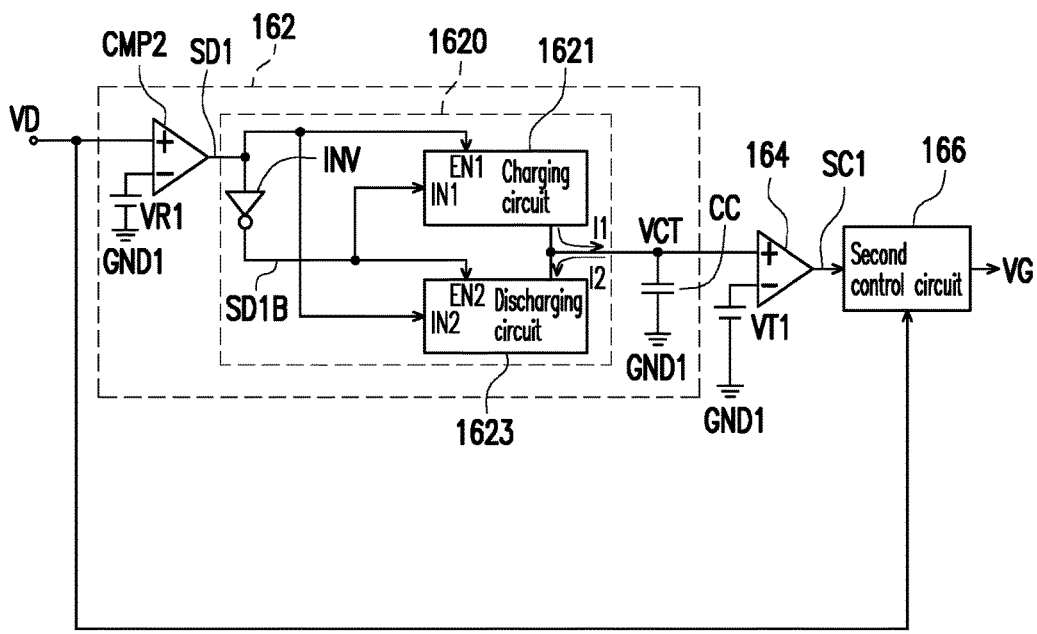
FIG. 9 is a schematic circuit structure diagram of the SR control circuit depicted in FIG. 8.

With reference to FIG. 1, FIG. 8 and FIG. 9 simultaneously hereinafter, FIG. 8 is a schematic circuit block diagram illustrating an SR control circuit 160' according to another embodiment of the disclosure, and FIG. 9 is a schematic circuit structure diagram of the SR control circuit 160' depicted in FIG. 8. The SR control circuit 160' depicted in FIG. 8 includes a first control circuit 162, a first comparator 164 and a second control circuit 166. In comparison with the SR control circuit 160 depicted in FIG. 2, the third control circuit 168 depicted in FIG. 2 may be omitted from the SR control circuit 160' depicted in FIG. 8. To clearer, in the embodiment illustrated in FIG. 8, no matter whether the power conversion apparatus 100 is operated in the CCM, the DCM or the BCM, when to disable the SR transistor Msr may be determined by the first control circuit 162 and the first comparator 164, so as to avoid the on period of the power switch Mp from overlapping the on period of the SR transistor Msr. The circuit structures including the first control circuit 162, the first comparator 164 and the second control circuit 166 illustrated in FIG. 8 and FIG. 9 are similar to the circuit structures including the first control circuit 162, the first comparator 164 and the second control circuit 166 depicted in FIG. 2 and FIG. 5 and thus, may refer to the descriptions with respect to the circuit structures illustrated in FIG. 2 and FIG. 5 and thus, will not be repeated.

It should be noted that the voltage level of the first reference voltage VR1 of the embodiments illustrated in FIG. 8 and FIG. 9 may be different from the voltage level of the first reference voltage VR1 of the embodiments illustrated in FIG. 2 and FIG. 5. As described above, in the embodiments illustrated in FIG. 2 and FIG. 5, the designer may achieve the first duty cycle signal SD1 generated by the first control circuit 162 substantially to be the PWM signal PWM generated by the PWM signal generator 110 through adjusting or setting the voltage level of the first reference voltage VR1, as shown in FIG. 3 or FIG. 4.

Figure 10:
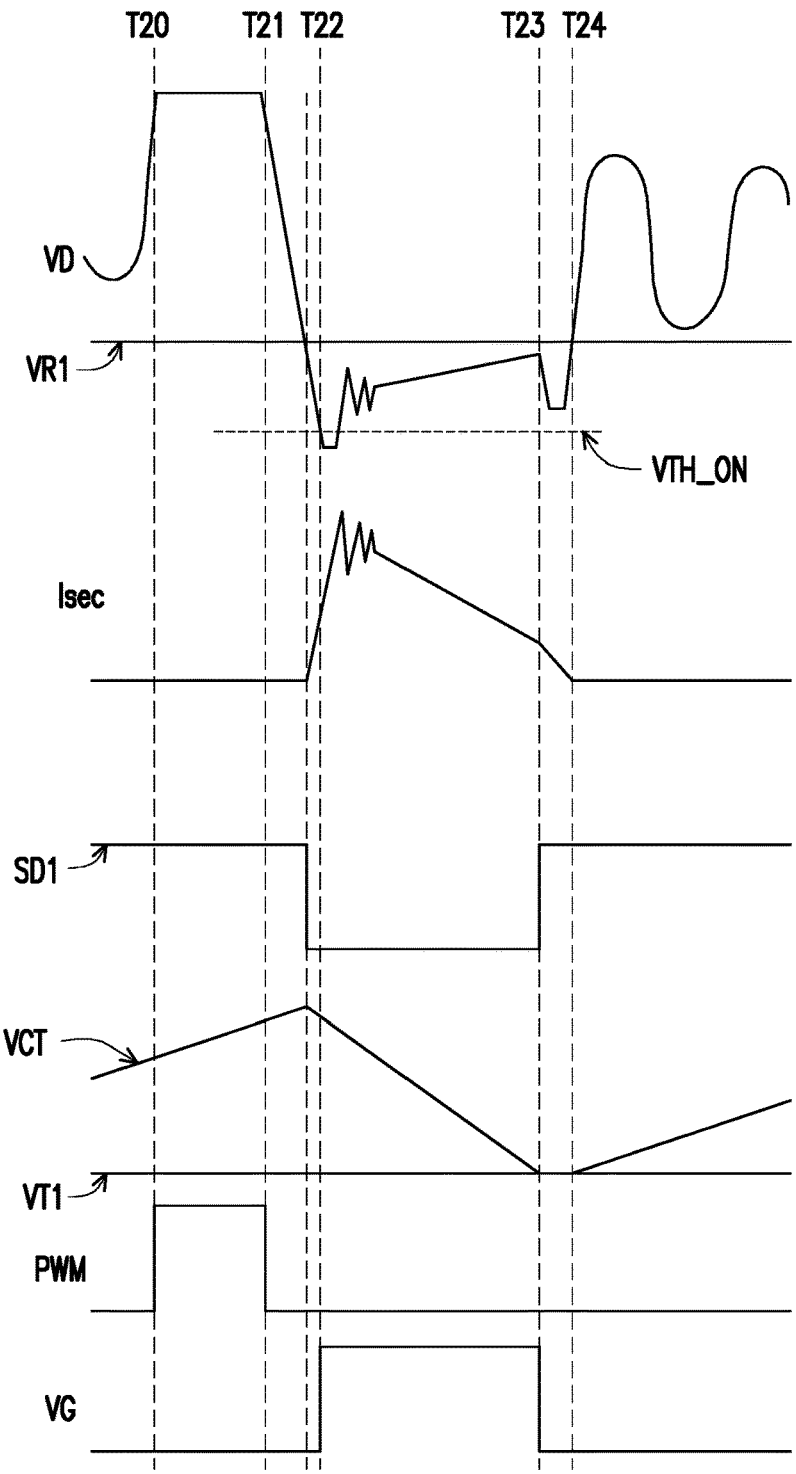
FIG. 10 is a schematic signal timing diagram of the power conversion apparatus depicted in FIG. 1 and the SR control circuit depicted in FIG. 8 being operated in the DCM or the BCM.
Figure 11:
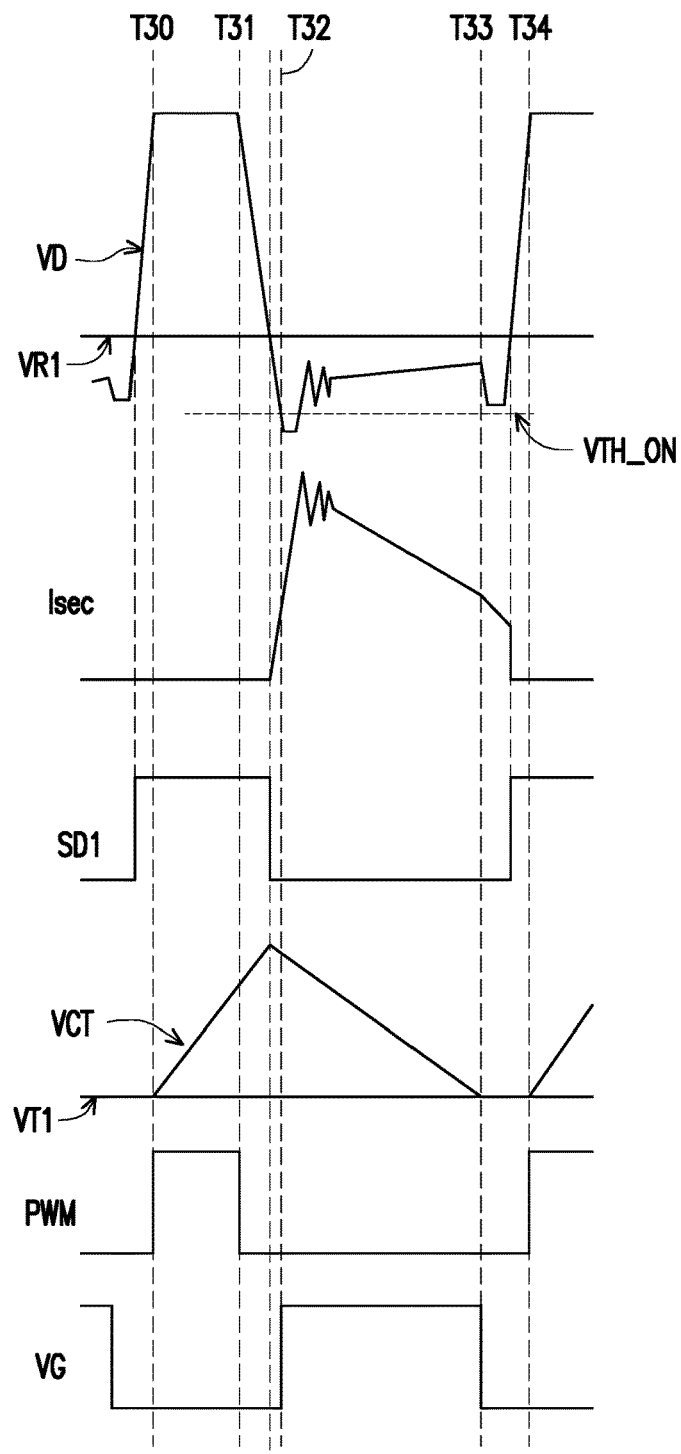
FIG. 11 is a schematic signal timing diagram of the power conversion apparatus depicted in FIG. 1 and the SR control circuit depicted in FIG. 8 being operated in the CCM.

In contrast, in the embodiments illustrated in FIG. 8 and FIG. 9, the designer may achieve the first duty cycle signal SD1 generated by the first control circuit 162 substantially to be similar to an inverted single of the control signal VG through adjusting or setting the voltage level of the first reference voltage VR1. With reference to both FIG. 10 and FIG. 11, FIG. 10 is a schematic signal timing diagram of the power conversion apparatus 100 depicted in FIG. 1 and the SR control circuit 160' depicted in FIG. 8 being operated in the DCM or the BCM, and FIG. 11 is a schematic signal timing diagram of the power conversion apparatus 100 depicted in FIG. 1 and the SR control circuit 160' depicted in FIG. 8 being operated in the CCM. In this way, the enable period of the first duty cycle signal SD1 is an off period of the SR transistor Msr, and the disable period of the first duty cycle signal SD1 may include the on period of the SR transistor Msr, but the disclosure is not limited thereto. In the embodiments illustrated in FIG. 10 and FIG. 11, the voltage level of the first reference voltage VR1 may be set to be 0V, but the disclosure is not limited thereto.

Additionally, the current value of the charging current I1 may be proportional to the time length of the disable period of the first duty cycle signal SD1 (or the on period of the SR transistor Msr), while the current value of the discharging current I2 may be proportional to the time length of the enable period of the first duty cycle signal SD1 (or the off period of the SR transistor Msr), but the disclosure is not limited thereto. Thus, the charging current I1 and the discharging current I2 may be calculated by formulas (3) and (4), where K may be a constant, and DUTY_Q2 may be a duty cycle of the first duty cycle signal SD1 (or approximate to a duty cycle of the control signal VG).

$$I1 = K \times DUTY\_Q2 \qquad \text{Formula (3)}$$

$$I2 = K \times (1 - DUTY\_Q2) \qquad \text{Formula (4)}$$

With reference to FIG. 1, FIG. 8 to FIG. 10 simultaneously hereinafter, as for the overall operation of the power conversion apparatus 100, the operations of the power conversion apparatus 100 at times T20, T21, T22 and T24 in FIG. 10 are respectively similar to the operations at the times T0, T1, T2 and T4 in FIG. 3, which may refer to the description with respect to FIG. 3 and will not be repeatedly described. Being different from the operation of the power conversion apparatus 100 at the time T3 in FIG. 3, at a time T23 in FIG. 10, the first voltage VCT generated by the first control circuit 162 may be discharged to be lower than the first threshold voltage VT1 (by means of adjusting the current value of the charging current I1 calculated according to formula (3) and the current value of the discharging current I2 calculated according to formula (4)). Thus, when the power conversion apparatus 100 is operated in the DCM or the BCM, the second control circuit 166 may disable the SR transistor Msr according to the first comparison signal SC1 generated by the first control circuit 162 and the first comparator 164, and thus, the second control circuit 166 may be used to substitute for the third control circuit 168 illustrated in FIG. 2. In addition, the operation of the SR control circuit 160' of FIG. 8 in the CCM (from a time T30 to a time T34 as shown in FIG. 11) is similar to the SR control circuit 160 of FIG. 2 in the CCM (from the time T10 to the time T14 as shown in FIG. 4), which may refer to the description with respect to FIG. 4 and will not be repeatedly described.

Figure 12:
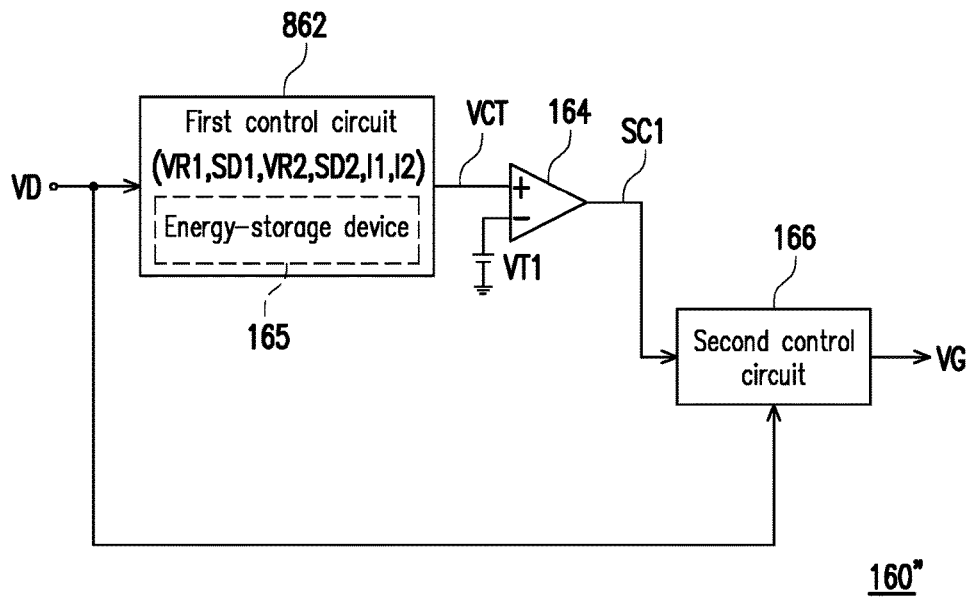
FIG. 12 is a schematic circuit block diagram illustrating an SR control circuit according to yet another embodiment of the disclosure.
Figure 13:
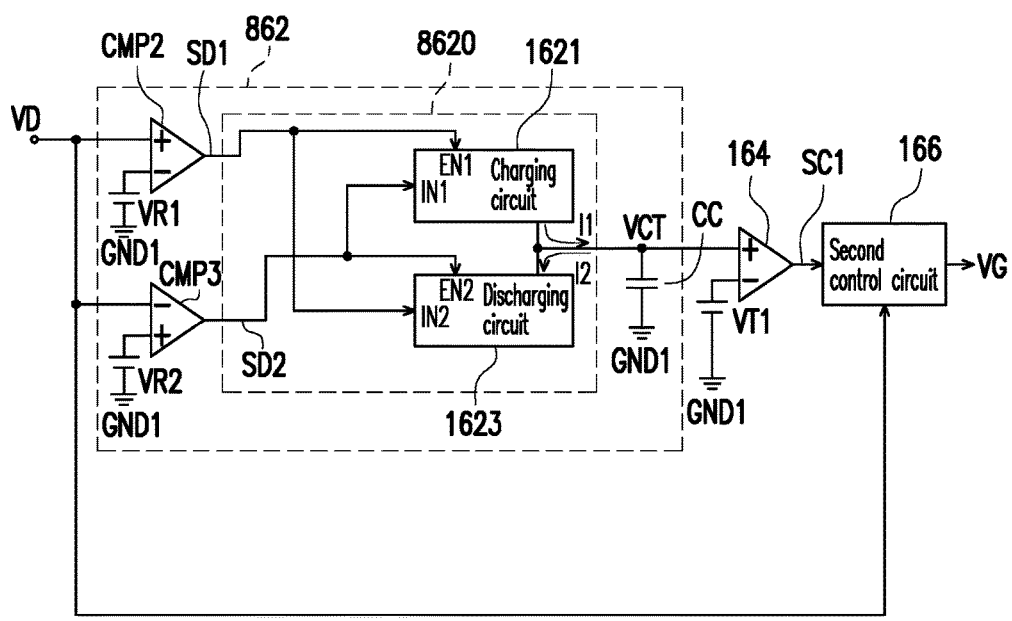
FIG. 13 is a schematic circuit structure diagram of the SR control circuit depicted in FIG. 12.
Figure 14:
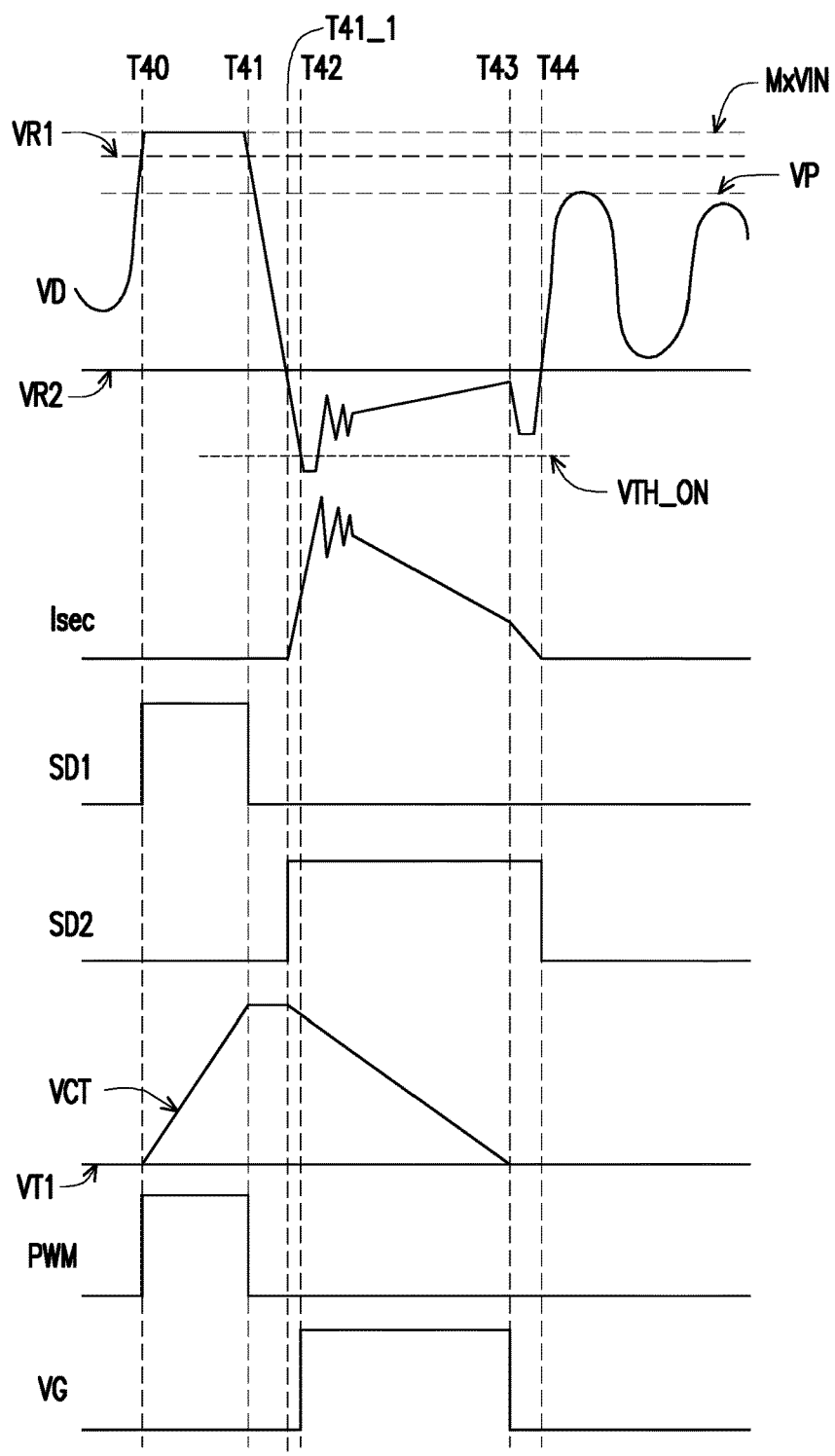
FIG. 14 is a schematic signal timing diagram of the power conversion apparatus depicted in FIG. 1 and the SR control circuit depicted in FIG. 12 and FIG. 13 being operated in the DCM or the BCM.
Figure 15:
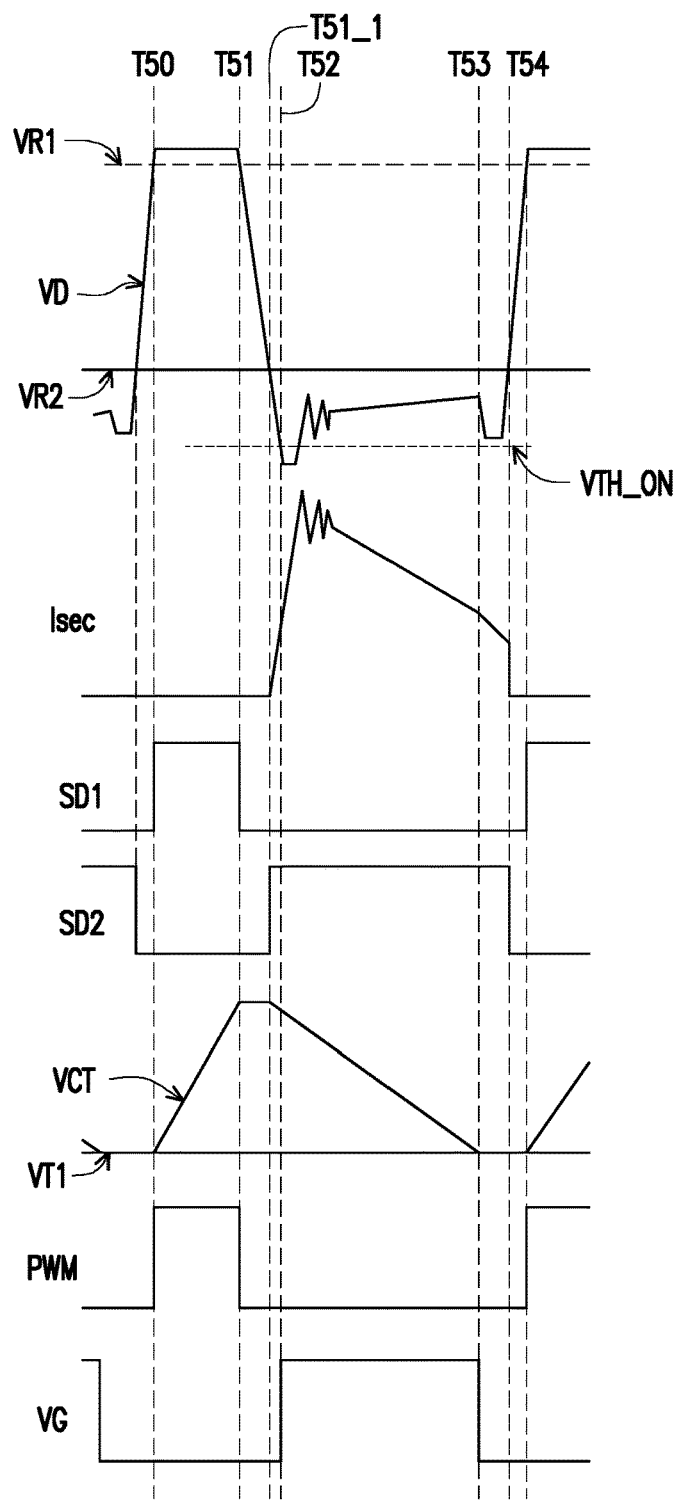
FIG. 15 is a schematic signal timing diagram of the power conversion apparatus depicted in FIG. 1 and the SR control circuit depicted in FIG. 12 and FIG. 13 being operated in the CCM.

With reference to FIG. 1, FIG. 12 to FIG. 15 simultaneously hereinafter, FIG. 12 is a schematic circuit block diagram illustrating an SR control circuit 160" according to yet another embodiment of the disclosure, FIG. 13 is a schematic circuit structure diagram of the SR control circuit 160" depicted in FIG. 12, FIG. 14 is a schematic signal timing diagram of the power conversion apparatus 100 depicted in FIG. 1 and the SR control circuit 160" depicted in FIG. 12 and FIG. 13 being operated in the DCM or the BCM, and FIG. 15 is a schematic signal timing diagram of the power conversion apparatus 100 depicted in FIG. 1 and the SR control circuit 160" depicted in FIG. 12 and FIG. 13 being operated in the CCM. The SR control circuit 160" depicted in FIG. 12 may include a first control circuit 862, the first comparator 164 and the second control circuit 166. The first control circuit 862 may configured to compare the detection signal VD with the first reference voltage VR1 to generate the first duty cycle signal SD1 (as shown in FIG. 14). The first control circuit 862 may be configured to compare the detection signal VD with a second reference voltage VR2 to generate the second duty cycle signal SD2 (as shown in FIG. 14). The first control circuit 862 may convert the first duty cycle signal SD1 into the discharging current I2, convert the second duty cycle signal SD2 into the charging current I1, and charge and discharge the energy-storage device 165 according to the charging current I1 and the discharging current I2 to generate the first voltage VCT (as shown in FIG. 14).

The first comparator 164 is coupled to the first control circuit 862 to receive the first voltage VCT and compare the first voltage VCT with the first threshold voltage VT1 to generate the first comparison signal SC1. The second control circuit 166 is coupled to the first comparator 164 to receive the first comparison signal SC1. In the present embodiment, no matter whether the power conversion apparatus 100 is operated in the CCM, the DCM or the BCM, as along as the first comparison signal SC1 indicates that the first voltage VCT is lower than the first threshold voltage VT1, the second control circuit 166 may generate the control signal VG to disable the SR transistor Msr (e.g., a time T43 in FIG. 14).

Referring to FIG. 13, the first control circuit 862 may include the second comparator CMP2, the third comparator CMP3, a conversion circuit 8620 and the charging/discharging capacitor CC, and in this embodiment, the charging/discharging capacitor CC is substantially the energy-storage device 165 depicted in FIG. 12. The non-inverting input terminal of the second comparator CMP2 may receive the detection signal VD, the inverting input terminal of the second comparator CMP2 may receive the first reference voltage VR1, and the output terminal of the second comparator CMP2 may output the first duty cycle signal SD1. The inverting input terminal of the third comparator CMP3 may receive the detection signal VD, the non-inverting input terminal of the third comparator CMP3 may receive the second reference voltage VR2, and the output terminal of the third comparator CMP3 may output the second duty cycle signal SD2.

The conversion circuit 8620 is coupled to the second comparator CMP2 to receive the first duty cycle signal SD1. The conversion circuit 8620 is further coupled to the third comparator CMP3 to receive the second duty cycle signal SD2. The conversion circuit 8620 may convert the second duty cycle signal SD2 to generate the charging current I1. The conversion circuit 8620 may convert the first duty cycle signal SD1 to generate the discharging current I2. The first terminal of the charging/discharging capacitor CC is coupled to the conversion circuit 8620, and the second terminal of the charging/discharging capacitor CC is coupled to the first ground terminal GND1. The conversion circuit 8620 may charge the charging/discharging capacitor CC according to the charging current I1 during the enable period of the first duty cycle signal SD1, e.g., during a time period from a time T40 to a time T41 as illustrated in FIG. 14, or during a time period from a time T50 to a time T51 as illustrated in FIG. 15. The conversion circuit 8620 may discharge the charging/discharging capacitor CC according to the discharging current I2 (until being discharged to 0V) during an enable period of the second duty cycle signal SD2, e.g., a time period from a time T41_1 to a time T44 as illustrated in FIG. 14, or during a time period from a time T51_1 to a time T54 as illustrated in FIG. 15.

It should be specially noted that in the embodiments illustrated in FIG. 12 and FIG. 13, the designer may achieve the first duty cycle signal SD1 generated by the first control circuit 862 to substantially be the PWM signal PWM generated by the PWM signal generator 110 and achieve the second duty cycle signal SD2 generated by the first control circuit 862 to be similar to the control signal VG through adjusting or setting the voltage level of the first reference voltage VR1 and a voltage level of the second reference voltage VR2, as shown in FIG. 14, where the first reference voltage VR1 is greater than the second reference voltage VR2. In this way, the enable period of the first duty cycle signal SD1 is the on period of the power switch Mp, and the enable period of the second duty cycle signal SD2 may include the on period of the SR transistor Msr, but the disclosure is not limited thereto. In other words, the conversion circuit 8620 substantially charges the charging/discharging capacitor CC according to the charging current I1 during the on period of the power switch Mp, and may discharge the charging/discharging capacitor CC according to the discharging current I2 during the on the period of the SR transistor Msr. In the embodiments illustrated in FIG. 14 and FIG. 15, the voltage level of the first reference voltage VR1 may be set to be within the range between M×VIN and the maximum peak value VP of the resonance waveform, and the second reference voltage VR2 may be set at 0V, but the disclosure is not limited thereto.

Additionally, the current value of the charging current I1 may be proportional to the time length of the enable period of the second duty cycle signal SD2 (or the on period of the SR transistor Msr), while the current value of the discharging current I2 may be proportional to the time length of the enable period of the first duty cycle signal SD1 (or the on period of the power switch Mp), but the disclosure is not limited thereto. In this way, the charging current I1 and the discharging current I2 may be calculate by formulas (5) and (6), where K may be a constant, and DUTY_Q1 may be the duty cycle of the first duty cycle signal SD1 (or a duty cycle of the PWM signal PWM), and DUTY_Q2 may be a duty cycle of the second duty cycle signal SD2 (or approximate to a duty cycle of the control signal VG).

$$I1 = K \times DUTY\_Q2 \quad \text{Formula (5)}$$

$$I2 = K \times DUTY\_Q1 \quad \text{Formula (6)}$$

To be more detailed, as for the overall operation of the power conversion apparatus 100, the operations of the power conversion apparatus 100 at the times T40, T41, T42 and T44 in FIG. 14 are respectively similar to the operations at the times T0, T1, T2 and T4 in FIG. 3, which may refer to the description with respect to FIG. 3 and will not be repeatedly described. Being different from the operation of the power conversion apparatus 100 at the time T3 in FIG. 3, at the time T43 of FIG. 14, the first voltage VCT generated by the first control circuit 862 may be discharged to be lower than the first threshold voltage VT1 (by means of adjusting the current value of the charging current I1 calculated according to formula (5) and the current value of the discharging current I2 calculated according to formula (6)). Thus, when the power conversion apparatus 100 is operated in the DCM or the BCM, the second control circuit 166 may disable the SR transistor Msr according to the first comparison signal SC1 generated by the first control circuit 862 and the first comparator 164, and thus, the second control circuit 166 may be used to substitute for the third control circuit 168 illustrated in FIG. 2. In addition, the operation of the SR control circuit 160″ of FIG. 12 and FIG. 13 in the CCM (as shown in FIG. 15) is similar to the SR control circuit 160 of FIG. 2 in the CCM (as shown in FIG. 4), which may refer to the description with respect to FIG. 4 and will not be repeatedly described.

Referring to FIG. 13 again, the conversion circuit 8620 may include the charging circuit 1621 and the discharging circuit 1623. The enable terminal EN1 of the charging circuit 1621 is coupled to the output terminal of the second comparator CMP2 to receive the first duty cycle signal SD1, and the input terminal IN1 of the charging circuit 1621 is coupled to the output terminal of the third comparator CMP3 to receive the second duty cycle signal SD2. The charging circuit 1621 may convert the second duty cycle signal SD2 into the charging current I1 and may charge the charging/discharging capacitor CC according to the charging current I1 during the enable period of the first duty cycle signal SD1.

The input terminal IN2 of the discharging circuit 1623 is coupled to the output terminal of the second comparator CMP2 to receive the first duty cycle signal SD1. The enable terminal EN2 of the discharging circuit 1623 is coupled to the output terminal of the third comparator CMP3 to receive the second duty cycle signal SD2. The discharging circuit 1623 may convert the first duty cycle signal SD1 into the discharging current I2 and discharge the charging/discharging capacitor CC according to the discharging current I2 during the enable period of the second duty cycle signal SD2.

The charging circuit 1621 and the discharging circuit 1623 illustrated in FIG. 13 are respectively similar to the charging circuit 1621 and the discharging circuit 1623 illustrated in FIG. 5, thus, the implementation of the charging circuit 1621 and the discharging circuit 1623 in FIG. 13 may refer to the description with respect to FIG. 5 and will not be repeated.

To summarize, the power conversion apparatus provided by the embodiments of the disclosure can be operated in the DCM, the BCM or the CCM. When the power conversion apparatus is operated in the CCM, the SR control circuit can turn off the SR transistor of the secondary side of the power conversion apparatus before the power switch of the primary side of the power conversion apparatus is turned on. In this way, the noise occurring due to the on period of the power switch overlapping the on period of the SR transistor can be avoided, and the internal circuit elements of the power conversion apparatus can be prevented from being damaged.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A power conversion apparatus, comprising:
a transformer, having a primary side and a secondary side, wherein a first terminal of the primary side is configured to receive an input voltage, and a first terminal of the secondary side is configured to provide an output voltage to a load;
a synchronous rectification (SR) transistor, having a drain terminal coupled to a second terminal of the secondary side, a source terminal coupled to a first ground terminal and a gate terminal configured to receive a control signal; and
an SR control circuit, coupled to the SR transistor, receiving a signal of the drain terminal of the SR transistor and serving the signal as a detection signal, and generating at least one duty cycle signal according to the detection signal,
wherein the SR control circuit converts the at least one duty cycle signal into a charging current and a discharging current, charges and discharges an energy-storage device according to the charging current and the discharging current to generate a first voltage and generates the control signal according to the first voltage to disable the SR transistor,
wherein the at least one duty cycle signal comprises a first duty cycle signal and a second duty cycle signal, and the SR control circuit comprises:
a first control circuit, configured to compare the detection signal with a first reference voltage to generate the first duty cycle signal, compare the detection signal with a second reference voltage to generate the second duty cycle signal, convert the first duty cycle signal into the discharging current, convert the second duty cycle signal into the charging current, charge the energy-storage device during the enable period of the first duty cycle signal and discharge the energy-storage device during an enable period of the second duty cycle signal to generate the first voltage;
a first comparator, coupled to the first control circuit to receive the first voltage, and comparing the first voltage with a first threshold voltage to generate a first comparison signal; and
a second control circuit, coupled to the first comparator to receive the first comparison signal and generating the control signal to disable the SR transistor when the first comparison signal indicates that the first voltage is lower than the first threshold voltage.

2. The power conversion apparatus according to claim 1, wherein the first control circuit comprises:
a second comparator, having a non-inverting input terminal receiving the detection signal, an inverting input terminal receiving the first reference voltage, and an output terminal outputting the first duty cycle signal;
a third comparator, having an inverting input terminal receiving the detection signal, a non-inverting input terminal receiving the second reference voltage and an output terminal outputting the second duty cycle signal;
a conversion circuit, coupled to the second comparator to receive the first duty cycle signal, coupled to the third comparator to receive the second duty cycle signal, converting the second duty cycle signal to generate the charging current and converting the first duty cycle signal to generate the discharging current; and
a charging/discharging capacitor, having a first terminal coupled to the conversion circuit and a second terminal coupled to the first ground terminal,
wherein the conversion circuit charges the charging/discharging capacitor according to the charging current during the enable period of the first duty cycle signal and discharges the charging/discharging capacitor according to the discharging current during the enable period of the second duty cycle signal to generate the first voltage.

3. The power conversion apparatus according to claim 2, wherein the conversion circuit comprises:
a charging circuit, having an enable terminal coupled to the output terminal of the second comparator to receive the first duty cycle signal, an input terminal coupled to the output terminal of the third comparator to receive the second duty cycle signal, converting the second duty cycle signal into the charging current and charging the charging/discharging capacitor according to the charging current during the enable period of the first duty cycle signal; and
a discharging circuit, having an input terminal coupled to the output terminal of the second comparator to receive the first duty cycle signal, having an enable terminal coupled to the output terminal of the third comparator to receive the second duty cycle signal, converting the first duty cycle signal into the discharging current and discharging the charging/discharging capacitor according to the discharging current during the enable period of the second duty cycle signal.

4. The power conversion apparatus according to claim 3, wherein the charging circuit comprises:
a first transistor, having a drain terminal coupled to a power supply terminal and a gate terminal coupled to the input terminal of the charging circuit to receive the inverting first duty cycle signal;
a first resistor, having a first terminal coupled to a source terminal of the first transistor and a second terminal coupled to the first ground terminal;
a first capacitor, having a first terminal coupled to the source terminal of the first transistor to generate a charging voltage and a second terminal coupled to the first ground terminal;
a voltage-to-current convertor, coupled to the first terminal of the first capacitor to receive the charging voltage, so as to generate the charging current; and
a charging switch, having a control terminal coupled to the enable terminal of the charging circuit to receive the first duty cycle signal, coupled between the voltage-to-current convertor and the first terminal of the charging/discharging capacitor, and transmitting the charging current during the enable period of the first duty cycle signal to charge the charging/discharging capacitor.

5. The power conversion apparatus according to claim 3, wherein the charging circuit comprises:
a controllable current source, having a control terminal coupled to the input terminal of the charging circuit to receive the inverting first duty cycle signal and a first terminal coupled to a power supply terminal;
a first capacitor, having a first terminal coupled to a second terminal of the controllable current source to generate a charging voltage and a second terminal coupled to the first ground terminal;

a voltage-to-current convertor, coupled to the first terminal of the first capacitor to receive the charging voltage, so as to generate the charging current; and a charging switch, having a control terminal coupled to the enable terminal of the charging circuit to receive the first duty cycle signal, coupled between the voltage-to-current convertor and the first terminal of the charging/discharging capacitor, and transmitting the charging current during the enable period of the first duty cycle signal to charge the charging/discharging capacitor.

6. The power conversion apparatus according to claim 3, wherein the discharging circuit comprises:

a first resistor, having a drain terminal coupled to a power supply terminal and a gate terminal coupled to the input terminal of the discharging circuit to receive the first duty cycle signal;

a first resistor, having a first terminal coupled to the source terminal of the first transistor and a second terminal coupled to the first ground terminal;

a first capacitor, having a first terminal coupled to the source terminal of the first transistor to generate a discharging voltage and a second terminal coupled to the first ground terminal;

a voltage-to-current convertor, coupled to the first terminal of the first capacitor to receive the discharging voltage, so as to generate the discharging current; and a discharging switch, having a control terminal coupled to the enable terminal of the discharging circuit to receive the inverting first duty cycle signal, coupled between the voltage-to-current convertor and the first terminal of the charging/discharging capacitor, and transmitting the discharging current during the disable period of the first duty cycle signal to discharge the charging/discharging capacitor.

7. The power conversion apparatus according to claim 3, wherein the discharging circuit comprises:

a controllable current source, having a control terminal coupled to the input terminal of the discharging circuit to receive the first duty cycle signal and a first terminal coupled to a power supply terminal;

a first capacitor, having a first terminal coupled to the second terminal of the controllable current source to generate a discharging voltage and a second terminal coupled to the first ground terminal;

a voltage-to-current convertor, coupled to the first terminal of the first capacitor to receive the discharging voltage, so as to generate the discharging current; and a discharging switch, having a control terminal coupled to the enable terminal of the discharging circuit to receive the inverting first duty cycle signal, coupled between the voltage-to-current convertor and the first terminal of the charging/discharging capacitor, and transmitting the discharging current during the disable period of the first duty cycle signal to discharge the charging/discharging capacitor.

8. The power conversion apparatus according to claim 1, further comprising:

a power switch, having a first terminal coupled to the second terminal of the primary side, a second terminal coupled to a second ground terminal and a control terminal controlled by a PWM signal, wherein the enable period of the first duty cycle signal is an on period of the power switch, and an enable period of the second duty cycle signal comprises an on period of the SR transistor, wherein the first reference voltage is greater than the second reference voltage.

9. The power conversion apparatus according to claim 1, wherein a current value of the charging current is proportional to a time length of the enable period of the second duty cycle signal; and a current value of the discharging current is proportional to a time length of the enable period of the first duty cycle signal.

* * * * *